US012264512B2

(12) United States Patent
Katagawa et al.

(10) Patent No.: US 12,264,512 B2
(45) Date of Patent: Apr. 1, 2025

(54) ACTUATOR DEVICE

(71) Applicant: MITSUI KINZOKU ACT CORPORATION, Kanagawa (JP)

(72) Inventors: Minetaka Katagawa, Kanagawa (JP); Yohei Tsuchiya, Kanagawa (JP); Chenming Zhang, Kanagawa (JP)

(73) Assignee: MITSUI KINZOKU ACT CORPORATION, Kanagawa (JP)

(*) Notice: Subject to any disclaimer, the term of this patent is extended or adjusted under 35 U.S.C. 154(b) by 332 days.

(21) Appl. No.: 17/344,778

(22) Filed: Jun. 10, 2021

(65) Prior Publication Data

US 2021/0388645 A1 Dec. 16, 2021

(30) Foreign Application Priority Data

Jun. 15, 2020 (JP) ................................ 2020-103328
Jun. 15, 2020 (JP) ................................ 2020-103329
Jun. 15, 2020 (JP) ................................ 2020-103330

(51) Int. Cl.

| | |
|---|---|
| ***E05B 81/06*** | (2014.01) |
| ***E05B 77/36*** | (2014.01) |
| ***E05B 79/08*** | (2014.01) |
| ***E05B 81/14*** | (2014.01) |
| ***E05B 81/16*** | (2014.01) |
| ***E05B 81/34*** | (2014.01) |
| ***E05B 85/02*** | (2014.01) |

(52) U.S. Cl.

CPC .............. *E05B 81/06* (2013.01); *E05B 77/36* (2013.01); *E05B 79/08* (2013.01); *E05B 81/14* (2013.01); *E05B 81/16* (2013.01); *E05B 81/34* (2013.01); *E05B 85/02* (2013.01)

(58) Field of Classification Search

CPC .......... E05B 81/06; E05B 81/14; E05B 81/20; E05B 81/30; E05B 81/34; E05B 81/36; E05B 81/42; E05B 85/02

See application file for complete search history.

(56) References Cited

U.S. PATENT DOCUMENTS

| | | | | |
|---|---|---|---|---|
| 5,564,308 | A | 10/1996 | Hoshikawa et al. | |
| 7,766,397 | B2 * | 8/2010 | Carabalona ............ | E05B 81/20 292/201 |
| 9,046,439 | B2 * | 6/2015 | Taurasi, I ................ | E05B 81/14 |
| 10,961,751 | B2 * | 3/2021 | Takagi .................... | E05B 83/36 |

(Continued)

FOREIGN PATENT DOCUMENTS

| | | |
|---|---|---|
| JP | H07238727 A | 9/1995 |
| JP | H10-146016 A | 5/1998 |

(Continued)

*Primary Examiner* — Christine M Mills
*Assistant Examiner* — Noah Horowitz
(74) *Attorney, Agent, or Firm* — Rimon P.C.

(57) ABSTRACT

An actuator device includes: a meshing unit configured to mesh with and release a striker, the meshing unit including a latch; an actuator unit including a motor; an output lever configured to rotate to transmit driving force of the motor in the actuator unit to the meshing unit to drive the meshing unit; and a support member both ends of which are coupled to the meshing unit, the support member being configured to support the actuator unit, wherein the output lever is separated from the support member when viewed from an approaching/separating direction of the striker with respect to the meshing unit.

8 Claims, 17 Drawing Sheets

(56) References Cited

U.S. PATENT DOCUMENTS

| | | | | |
|---|---|---|---|---|
| 11,035,156 | B2 * | 6/2021 | Damboiu | E05B 81/14 |
| 2006/0261601 | A1 * | 11/2006 | Shimizu | E05B 81/14<br>292/216 |
| 2009/0031838 | A1 | 2/2009 | Konomoto et al. | |
| 2009/0236863 | A1 * | 9/2009 | Akizuki | E05B 81/14<br>292/201 |
| 2017/0204639 | A1 | 7/2017 | Akahori et al. | |
| 2021/0238896 | A1 * | 8/2021 | Kajigai | E05B 77/34 |

FOREIGN PATENT DOCUMENTS

| | | | |
|---|---|---|---|
| JP | 2006322196 | A | 11/2006 |
| JP | 2012-241418 | A | 12/2012 |
| JP | 2013-014929 | A | 1/2013 |
| JP | 2016-023460 | A | 2/2016 |
| JP | 2016-137795 | A | 8/2016 |
| JP | 2017-225289 | A | 12/2017 |
| JP | 2020-066385 | A | 4/2020 |
| WO | 2007074527 | A1 | 7/2007 |

* cited by examiner

ACTUATOR DEVICE

CROSS-REFERENCE TO RELATED APPLICATION(S)

The present application claims priority to and incorporates by reference the entire contents of Japanese Patent Applications No. 2020-103328, No. 2020-103329 and No. 2020-103330 filed in Japan on Jun. 15, 2020.

BACKGROUND

The present disclosure relates to an actuator device.

An actuator device including a motor is provided on a vehicle. For example, an actuator device includes a door opening and closing device as disclosed in Japanese Patent Application Laid-open No. 2013-14929. The door opening and closing device in Japanese Patent Application Laid-open No. 2013-14929 is provided on a back door of a minivan and the like, and the back door is locked by causing a meshing mechanism to engage with a striker on the vehicle body side. Such a door opening and closing device includes an electric opening and closing mechanism, and for example, shifts the door from a half-latch state to a full-latch state.

In the door opening and closing device in Japanese Patent Application Laid-open No. 2013-14929, the weight of the back door to be driven is relatively heavy, and the back door is opened and closed in the direction of gravity. Thus, automatic close and open of the back door requires a large motor to be provided. Moreover, to endure a heavy load, the door opening and closing device is configured using a strong metal bracket as a base, and gears such as a deceleration mechanism is pivotally supported by the metal bracket.

A latch that engages with a striker is provided in the door opening and closing device, and the latch includes a latch lever. The rotation of the motor is decelerated by the deceleration mechanism, and a pin provided on a sector gear in the final stage operates the latch lever.

Moreover, a door opening and closing device is provided on a vehicle. For example, the door opening and closing device includes a latch that engages with a striker on the door. When the striker and the latch are in a half-latch state, the door opening and closing device can drive the latch to the full-latch state. On the door opening and closing device, a motor is mounted as an actuator for driving the latch. The door opening and closing device is connected to a body control module (BCM) via a harness. Various switches for detecting the state of the latch and the like are provided on the door opening and closing device, and signals of the switches are supplied to the BCM. The actuator is driven and controlled by the BCM on the basis of the switch signals and the like. A coupler that connects the harness is provided on the door opening and closing device. Examples of the door opening and closing device are disclosed in Japanese Patent Application Laid-open No. 2016-23460 and Japanese Patent Application Laid-open No. 2012-241418.

In the door opening and closing device disclosed in Japanese Patent Application Laid-open No. 2016-23460, the coupler, the motor, and the switches are connected by a plurality of terminals. The terminals are held by a terminal holding member made of resin. The terminal holding member is engaged with the housing by a predetermined engagement means.

In the door opening and closing device disclosed in Japanese Patent Application Laid-open No. 2012-241418, the coupler, the motor, and the switches are individually connected by wires.

Moreover, for example, an actuator device including a motor includes a power window device (Japanese Patent Application Laid-open No. 2017-225289) and a door opening and closing device (Japanese Patent Application Laid-open No. H10-146016).

In the devices disclosed in Japanese Patent Application Laid-open No. 2017-225289 and Japanese Patent Application Laid-open No. H10-146016, a plurality of rolling bearings and sliding bearings are additionally provided on a rotating shaft of a motor, to stabilize the rotation of the rotating shaft. In this manner, by additionally providing a plurality of bearings, it is possible to stabilize the rotation of the motor, and suppress vibration and noise.

To increase a vehicle interior space, downsizing of the door opening and closing device has been desired. In the door opening and closing device in Japanese Patent Application Laid-open No. 2013-14929, a sector gear is provided on a metal bracket, and a pin is protruded from the sector gear. Thus, the components are aligned in parallel in the front and rear direction, and at least the size in the front and rear direction is increased. Accordingly, further downsizing has been desired.

The present disclosure has been made in view of the above problem, and an object of the present disclosure is to provide an actuator device that can be further downsized.

In the door opening and closing device disclosed in Japanese Patent Application Laid-open No. 2016-23460, due to the structure, the motor and the terminal holding member are separate components, and are separately mounted in the housing. Moreover, the terminal and the power input unit of the motor need to be accurately positioned, and there remains a challenge in the assemblability. In the door opening and closing device disclosed in Japanese Patent Application Laid-open No. 2012-241418, the coupler, the motor, and the switches need to be separately wired, and there remains a challenge in the assemblability.

The present disclosure has been made in view of the above problems, and an object of the present disclosure is to provide an actuator device that can be easily assembled.

Bearings are relatively expensive components. Additionally providing bearings increases the number of components that may increase the number of assembly processes and the cost. In general, a plurality of bearings are required, and each of the bearings needs to be accurately mounted so as to be on the same axis as that of the rotating shaft, or the bearing support part needs to be formed with high accuracy.

SUMMARY

In some embodiments, an actuator device according to the present disclosure includes: a meshing unit configured to mesh with and release a striker, the meshing unit including a latch; an actuator unit including a motor; an output lever configured to rotate to transmit driving force of the motor in the actuator unit to the meshing unit to drive the meshing unit; and a support member both ends of which are coupled to the meshing unit, the support member being configured to support the actuator unit, wherein the output lever is separated from the support member when viewed from an approaching/separating direction of the striker with respect to the meshing unit.

In some embodiments, an actuator device according to the present, disclosure includes: a housing; a motor stored in the housing; and a terminal holding member holding a plurality of terminals made of a metal plate, wherein the motor includes: a main body; a rotating shaft protruding from a tip end side of the main body; and a power input end provided on a base end side of the main body, and the terminal holding member includes: a motor connection part configured to hold the terminals such that a power supply end that is an end of each of the terminals is connected to the power input end; a coupler configured to hold the terminals such that another end of each of the terminals is protruded, the coupler being configured to connect to an external harness; and a peripheral surface support part configured to support a peripheral surface of the main body.

In some embodiments, an actuator device according to the present disclosure includes: a housing; a motor stored in the housing; and a shaft abutment projection provided in the housing, the shaft abutment projection being configured to protrude from the housing and come into contact with a rotating shaft of the motor from a side.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION

Hereinafter, an embodiment, of an actuator device according to the present disclosure will be described in detail with reference to the accompanying drawings. However, the present disclosure is not limited to the embodiment.

Figure 1:
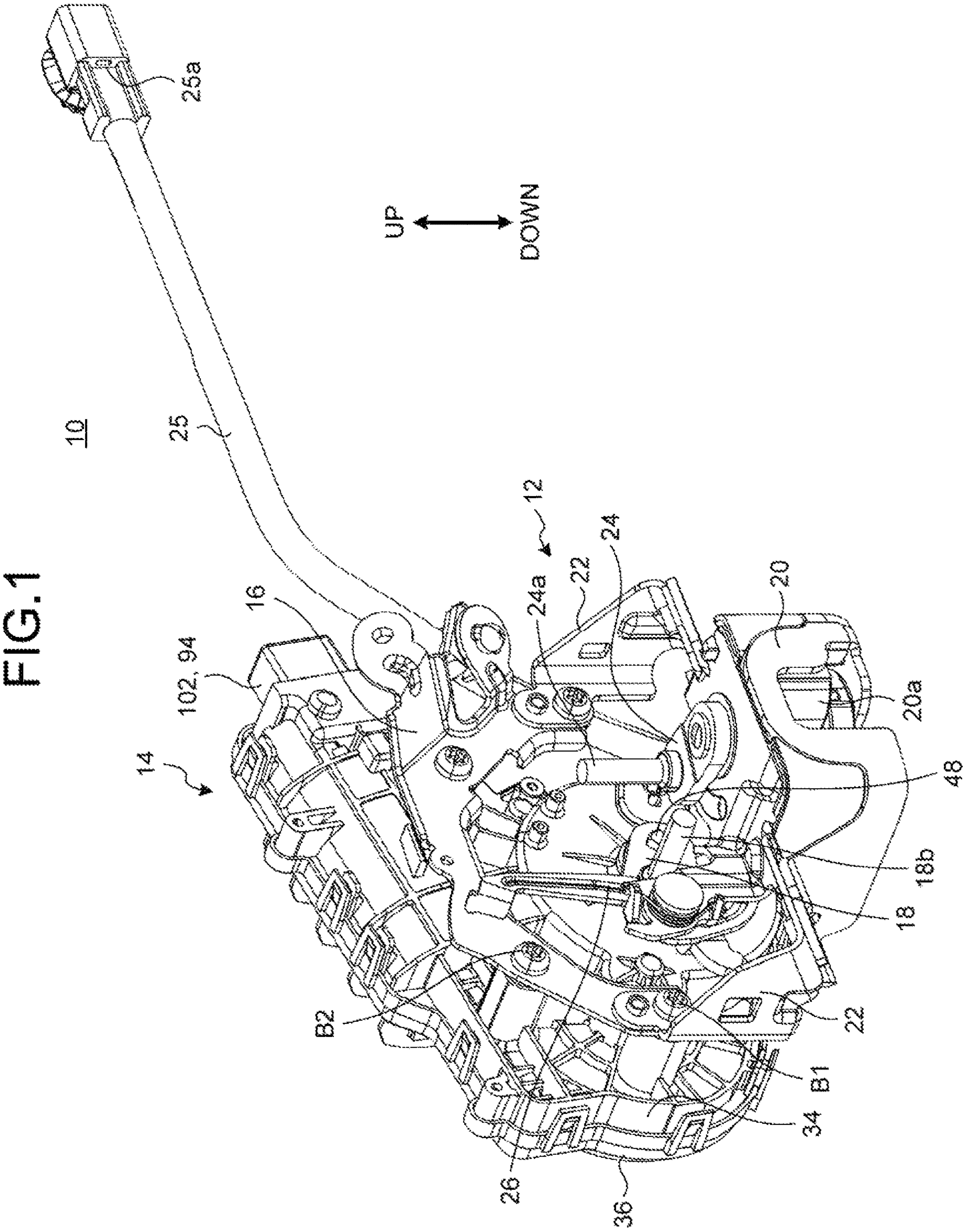
FIG. 1 is a perspective view illustrating a door opening and closing device that is an embodiment of an actuator device according to the present disclosure.
Figure 2:
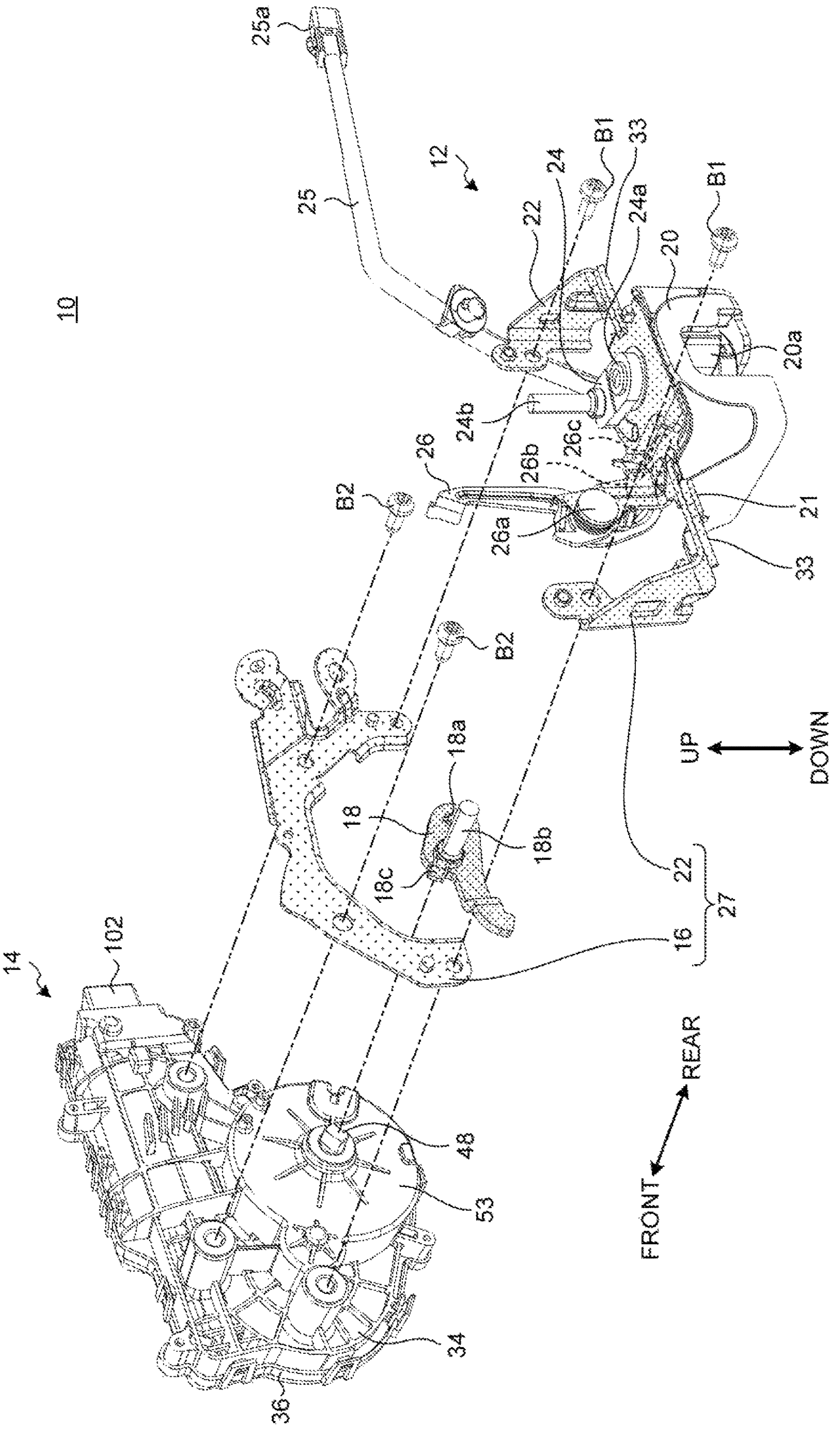
FIG. 2 is an exploded perspective view of the door opening and closing device.
Figure 3:
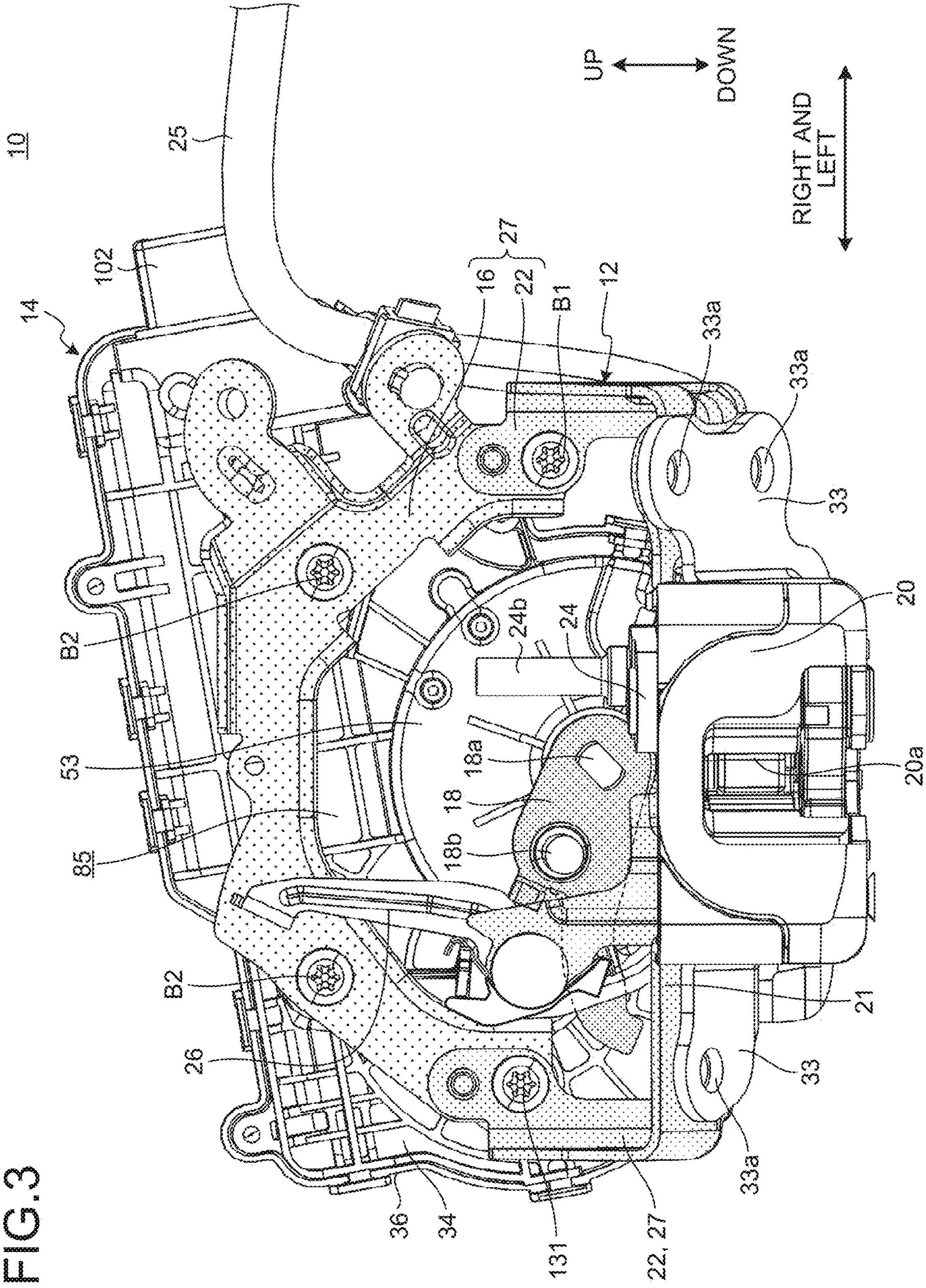
FIG. 3 is a rear view of the door opening and closing device.
Figure 4:
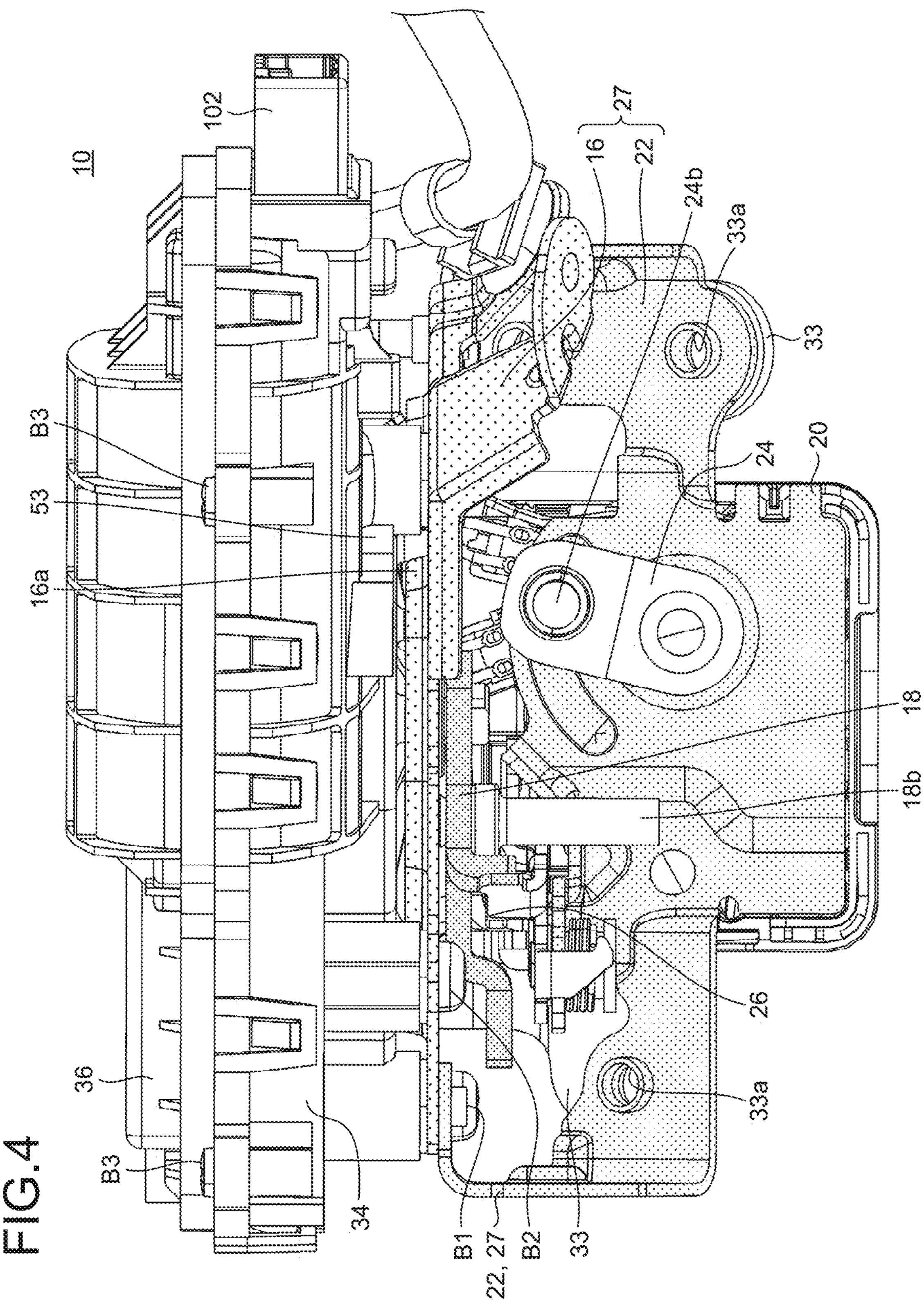
FIG. 4 is a plan view of the door opening and closing device.

FIG. 1 is a perspective view illustrating a door opening and closing device 10 that is an embodiment of an actuator device according to the present disclosure. FIG. 2 is an exploded perspective view of the door opening and closing device 10. FIG. 3 is a rear view of the door opening and closing device 10. FIG. 4 is a plan view of the door opening and closing device 10. For example, the door opening and closing device 10 is provided on a back door of a vehicle, engages with and disengages from a striker S (see FIG. 1 and FIG. 5) of a vehicle main body, and opens and closes the back door.

As illustrated in FIG. 1, the striker S moves in the front and rear direction relative to the door opening and closing device 10. Thus, in other words, the rear view of FIG. 3 is a diagram viewed from the approaching/separating direction of the striker S. Moreover, in other words, the plan view of FIG. 4 is a diagram viewed from a direction perpendicular to the approaching/separating direction of the striker S. The up and down direction, the front and rear direction, and the right and left direction of the door opening and closing device 10 are based on the attachment state (door closed state) of the door opening and closing device 10 to the vehicle. In the drawings, the directions are illustrated by arrows as appropriate. As illustrated in FIG. 1, FIG. 2, FIG. 3, and FIG. 4, the door opening and closing device 10 includes a meshing part 12 and an actuator unit 14. The meshing part 12 is a mechanism part configured to mesh with and release the striker S. The actuator unit 14 is a mechanism part that drives the meshing part 12. The meshing part 12 and the actuator unit 14 are fixed by a screw B2 via a second bracket 16. The actuator unit 14 drives the meshing part 12 via an output lever 18. In other words, the output lever 18 rotates to transmit the driving force of a motor 38 in the actuator unit 14 to the meshing part 12, and rotates to drive the meshing part 12. In FIG. 2, FIG. 3, and FIG. 4, the output lever 18 is indicated by the dark dots, the second bracket 16 is indicated by the light dots, and a base bracket 21 including a first bracket 22 is indicated by the middle dots. However, these dots are used for easy identification, and do not limit the disclosure in any way.

The meshing part 12 includes a body 20, the base bracket 21, a latch lever 24, a harness 25, and an open lever 26. Both right and left ends of the base bracket 21 are bent upward, and form a pair of the first brackets (first support members) 22. The base bracket 21 including the first brackets 22, the second bracket 16, and the output lever 18 are made of a metal material. The first brackets 22 form a support member 27 with the second bracket 16. The meshing part 12 and the actuator unit 14 can be disassembled, and are connected via the support member 27.

On the body 20, a striker entry groove **20*a* into which the striker S enters is formed. The body 20 includes a latch 30 (see FIG. 5) that engages with the striker S, and a ratchet 32 (see FIG. 5) that holds the latch 30 at a half-latch position or a full-latch position. A plurality of switches for detecting the rotation position of the latch 30 are provided on the body 20. The harness 25 includes wires connected to the switches, and a coupler 25*a* is provided on the tip end. The coupler 25*a* is connected to the BCM. The coupler 25*a* may also be integrated with a coupler 102 at an end part of the actuator unit 14**.

Attachment pieces 33, which are parts to be attached to the vehicle, are integrally formed on the right and left of the body 20. The outer shell part of the body 20 and the attachment pieces 33 are made of a metal material. One or two attachment holes **33*a* are formed on each of the attachment pieces 33. The support member 27 is fastened to the back door of the vehicle together with the meshing part 12, by a screw (not illustrated) inserted into the attachment hole 33***a*. Consequently, the door opening and closing device 10 is fixed to the back door.

The support member 27 formed of the pair of first brackets 22 and the second bracket 16 is a member supporting the actuator unit 14, and both ends of which are coupled to the attachment pieces 33 of the meshing part 12. Moreover, in other words, the second bracket 16 is coupled to the attachment pieces 33 via the first brackets 22.

In the support member 27, the first brackets 22 are connected to the attachment pieces 33 of the meshing part 12, and the second bracket 16 supports the actuator unit 14. The second bracket 16 is formed in a semicircular shape, and is arranged in the periphery of a circular projection part 53, which will be described below. A tapered throttle part 16*a* (see FIG. 4) that slightly protrudes towards the front is formed on the inner diameter side portion of the semicircular formed by the second bracket 16, and thus the strength is increased. Bach of the first brackets 22 and the second bracket 16 are connected by a joint screw B1. The joint screw B1 is also fastened together to the actuator unit 14.

The latch lever 24 rotates about a latch shaft 24*a* with the latch 30. An engagement pin 24*b* is provided on the tip end of the latch lever 24. The open lever 26 rotates about an open lever shaft 26*a*. The open lever 26 includes an engagement part 26*b* and an arm 26*c*. An output shaft 48 of the actuator unit 14 is fit into a shaft hole 18*a* of the output lever 18, and the output lever 18 rotates with the output shaft 48. The output lever 18 includes a pin 18*b* protruding toward the meshing part 12 side and a pressing part 18*c*. When the output lever 18 is rotated in the clockwise direction from the neutral position in FIG. 2, the pin 18*b* presses the engagement pin 24*b*, and rotates the latch lever 24. When the output lever 18 is rotated in the counterclockwise direction from the neutral position in FIG. 2, the pressing part 18*c* presses the engagement part 26*b*, and rotates the open lever 26.

Figure 5:
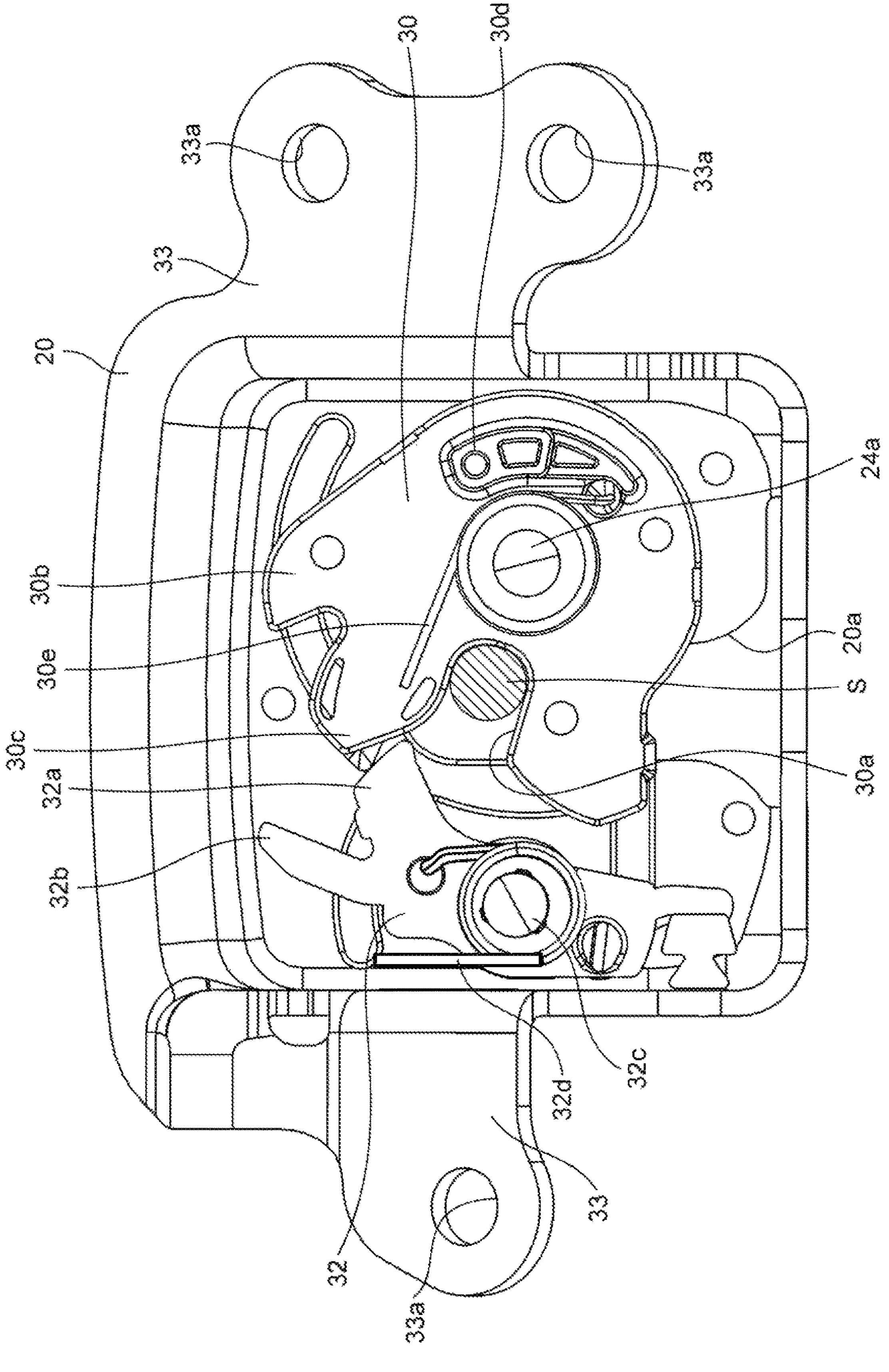
FIG. 5 is a diagram illustrating parts of a latch, a ratchet, and a body.

FIG. 5 is a diagram illustrating parts of the latch 30, the ratchet 32, and the body 20. The latch 30 includes a striker engagement groove 30*a* to which the striker S is engaged, a half-latch engagement part 30*b*, a full-latch engagement part 30*c*, and a cam 30*d*. The latch 30 can rotate about the latch shaft 24*a*. The latch 30 is energized in the counterclockwise direction by a spring 30*e*. The rotation angle of the latch 30 is transmitted to the BCM when the cam 30*d* turns ON and OFF a plurality of switches, which are not illustrated. The ratchet 32 includes a claw 32*a* and a pressed part 32*b*. The ratchet 32 can rotate about a ratchet shaft 32*c*. The ratchet 32 is energized in the clockwise direction by a spring 32*d*. The pressed part 32*b* is pressed by the arm 26*c* on the basis of the rotation of the output lever 18.

When the striker S enters the striker entry groove 20*a*, the latch 30 rotates in the clockwise direction, the claw 32*a* engages with the half-latch engagement part 30*b*, and the latch 30 is brought into the half-latch state. The BCM that has detected that the latch 30 is brought into the half-latch state further rotates the latch 30 in the clockwise direction via the actuator unit 14 and the output lever 18 (rotate in the clockwise direction from the neutral position illustrated in FIG. 2). Then, the claw 32*a* is engaged with the full-latch engagement part 30*c*, the latch 30 is brought into the full-latch state, and the back door is closed. FIG. 5 illustrates the full-latch state.

To open the back door, the BCM rotates the actuator unit 14 and the output lever 18 in the counterclockwise direction from the neutral position illustrated in FIG. 2. Then, the pressing part 18*c* (see FIG. 2) presses the engagement part 26*b* and rotates the open lever 26. Moreover, when the arm 26*c* of the open lever 26 presses the pressed part 32*b*, the ratchet 32 rotates in the counterclockwise direction in FIG. 5. Consequently, the claw 32*a* is moved, the full-latch engagement part 30*c* is released from the engagement state, the latch 30 rotates in the counterclockwise direction, and the striker S can be released from the striker engagement groove 30*a*. That is, the back door is opened.

Figure 6:
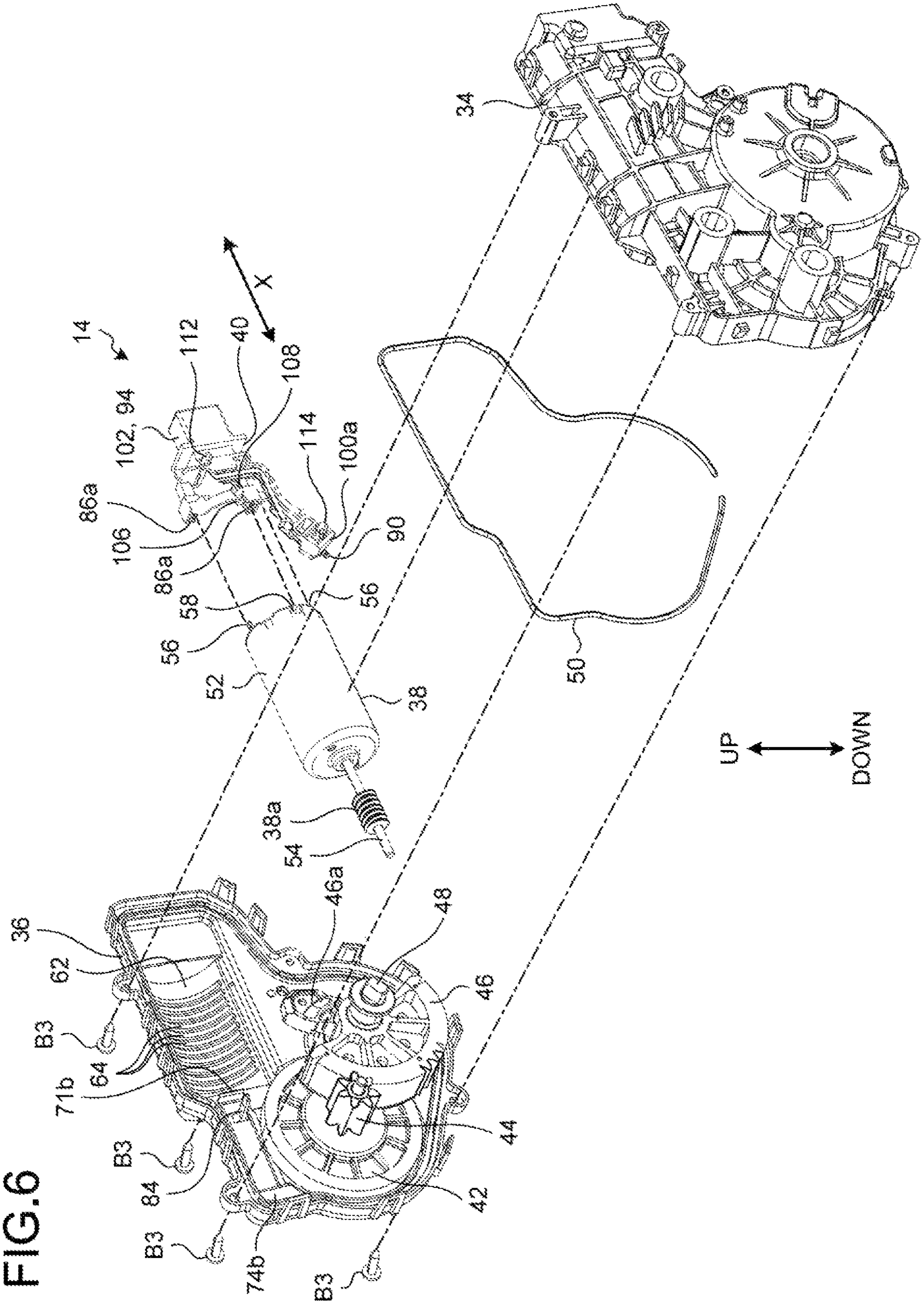
FIG. 6 is an exploded perspective view of an actuator unit.

FIG. 6 is an exploded perspective view of the actuator unit 14. In the actuator unit 14, a case (first housing) 34 and a cover (second housing) 36 form a housing. The case 34 and the cover 36 are made of a resin material. A material softer than that of the case 34 is used for the cover 36. For example, the case 34 is made of polybutylene terephthalate (PBT), and for example, the cover 36 is made of polyacetal (POM).

The case 34 is formed of slightly harder PBT, and stores gears (a worm wheel 42, a relay gear 44, an output gear 46, the output shaft 48, and the like), which will be described below. The case 34 is strong enough to pivotally support the gears, and strong enough to be attached to the vehicle via the second bracket 16 and the first brackets 22. The cover 36 also supports the gears, but compared to the case 34, in view of the strength, the cover 36 auxiliary supports the gears. Because the cover 36 is made of POM, which is softer than the case 34, the cover 36 can absorb vibration and noise.

The housing formed by the case 34 and the cover 36 includes the motor 38, a terminal holding member 40, the worm wheel 42, the relay gear 44, the output gear 46, and the output shaft 48. A waterproof seal 50 is provided between the case 34 and the cover 36. The case 34 and the cover 36 are fastened by a plurality of screws B3. In FIG. 6, the worm wheel 42, the relay gear 44, the output gear 46, and the output shaft 48 are illustrated with the cover 36 for easy view. However, during the actual assembly, the worm wheel 42, the relay gear 44, the output gear 46, and the output shaft 48 are arranged in the case 34 as illustrated in FIG. 7.

Figure 7:
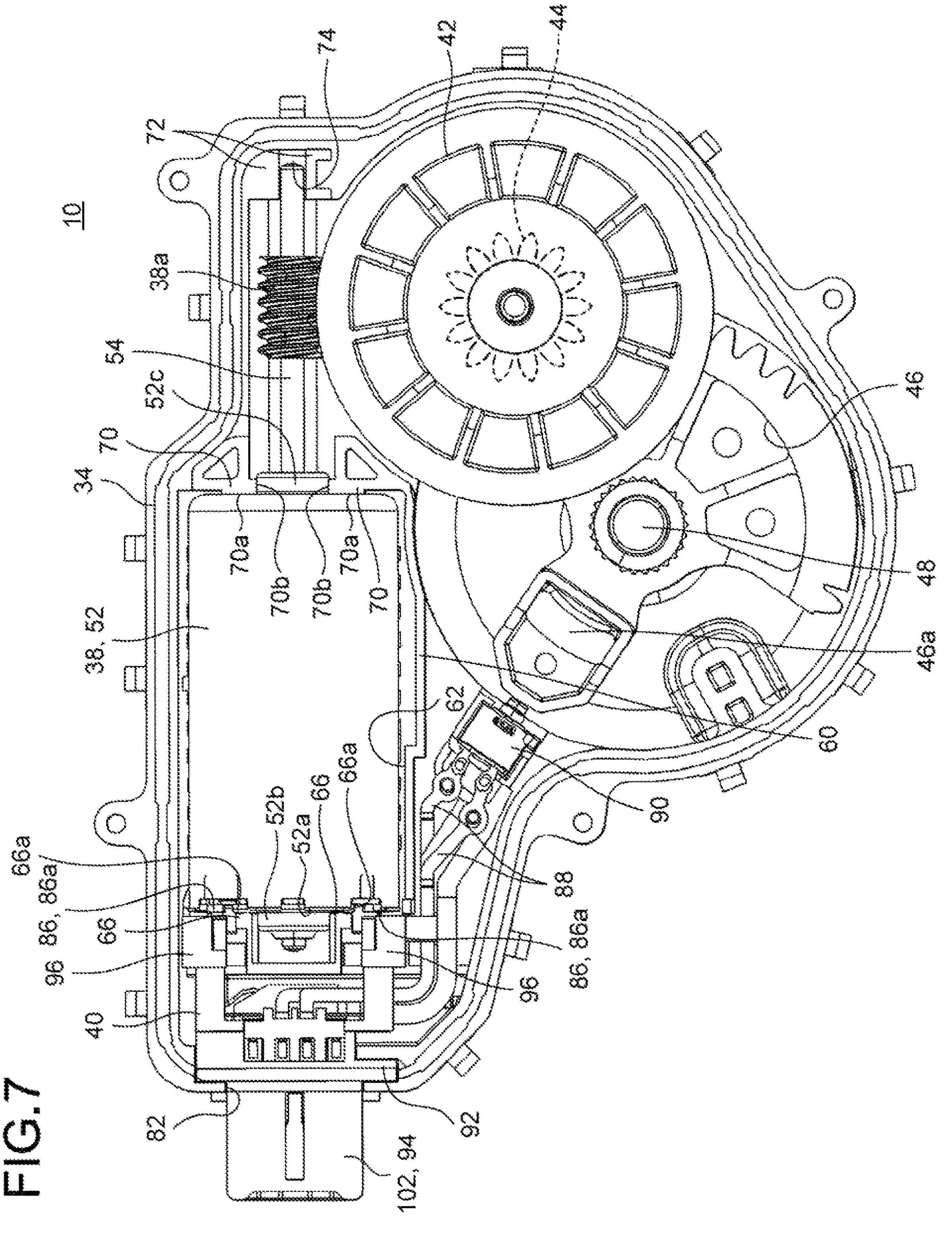
FIG. 7 is a diagram illustrating the door opening and closing device in a state in which the cover is removed.

FIG. 7 is a diagram illustrating the door opening and closing device 10 in a state in which the cover 36 is removed. The worm wheel 42 is driven by a worm gear 38*a* of the motor 38. The relay gear 44 is on the same axis as that of the worm wheel 42, and integrally rotates with the worm wheel 42. The output gear 46 is driven by the relay gear 44. The output shaft 48 is serration-connected to the output gear 46, and integrally rotates with the output gear 46. The rotation of the motor 38 is decelerated by the worm wheel 42, the relay gear 44, and the output gear 46, and is transmitted to the output shaft 48. As described above, the output shaft 48 rotates the output lever 18 (see FIG. 2). That is, the relay gear 44 and the output gear 46 form a deceleration mechanism 51 that decelerates the rotation of the motor 38 and that transmits the decelerated rotation to the output lever 18. The case 34 includes the circular projection part 53 (see FIG. 2) formed on the same axis as that of the output shaft 48 and protruding toward the rear. The circular projection part 53 covers the output gear 46. Teeth are formed on the output gear 46 over about 180 degrees, and a projection 46*a* is provided on the side where the teeth are not formed. The position of the projection 46*a* is detected by a switch 90.

Figure 8:
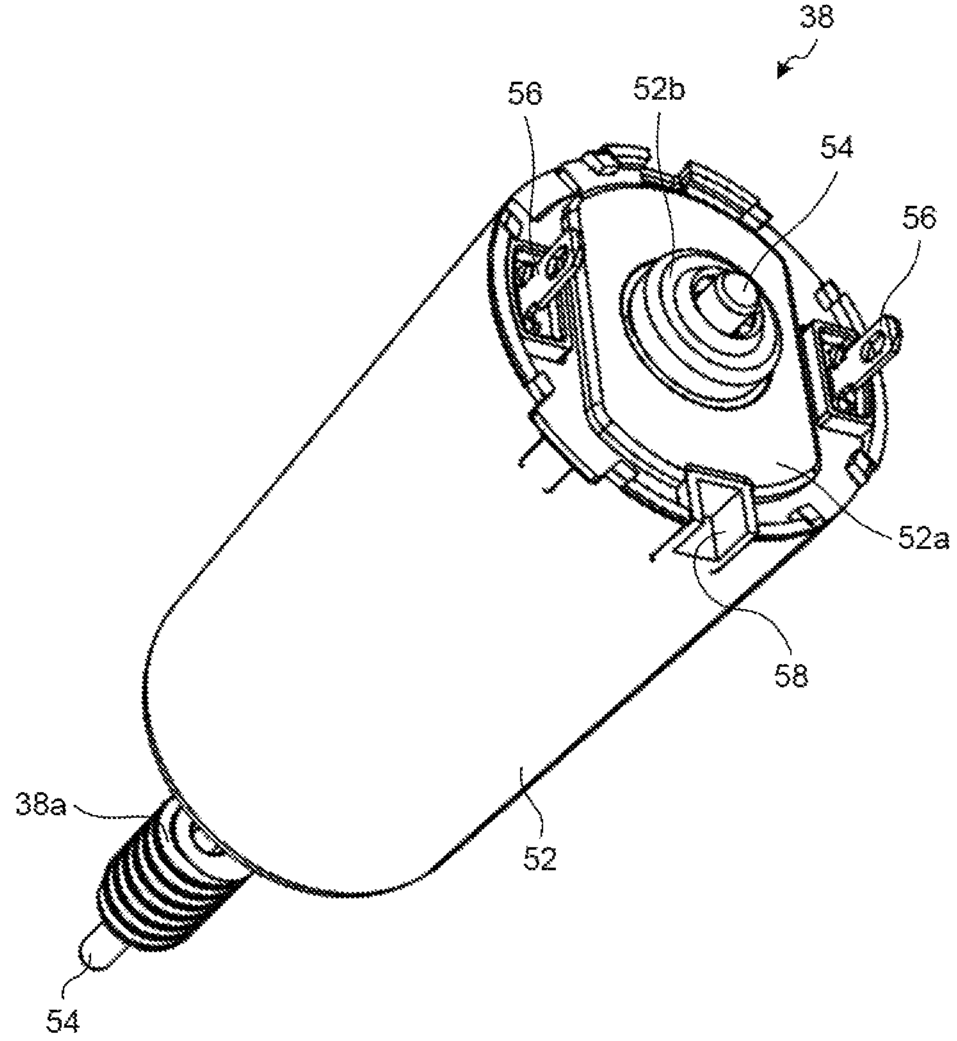
FIG. 8 is a perspective view of a motor.

FIG. 8 is a perspective view of the motor 38. The motor 38 includes a main body 52, a rotating shaft 54 protruding from the tip end side of the main body 52, and a pair of power input ends 56 provided on the base end side of the main body 52. The worm gear 38*a* is provided on the rotating shaft 54. The pair of power input ends 56 are thin plate pins that protrude toward the base end side, and are provided at symmetrical positions on the base end side of the main body 52 with the center point interposed therebetween.

Each of the power input ends 56 is a power input unit for driving the motor 38. The motor 38 is a direct current type, and there are two power input ends 56. However, if the motor 38 is an alternate current type, three power input ends 56 will be provided. Depending on the polarity of the power to be supplied to the pair of power input ends 56, the motor 38 is rotated in the forward direction or in the reverse direction.

A positioning engagement concave part 58 recessed in the radial direction is formed on the utmost base end side on the peripheral surface of the main body 52. The positioning engagement concave part 58 is opened toward the base end side. More precisely, the positioning engagement concave part 58 is opened on the base end side in the axial direction with respect to the motor 38. A substantially elliptically shaped plane part 52*a* is formed on the base end part of the main body 52 excluding where the power input ends 56 are located and the vicinity thereof. A cylindrical part 52*b* protruding slightly toward the base end side is provided in the center of the plane part 52*a*. A part of the rotating shaft 54 is exposed from the center of the cylindrical part 52*b*. In the center of the tip end part of the main body 52, a cylindrical part 52*c* (see FIG. 7) is formed similarly to the cylindrical part 52*b*. The cylindrical part. 52*c* protrudes slightly toward the tip end side. The rotating shaft 54 is protruded from the center of the cylindrical part 52*c*. Although not illustrated, a thin rubber sheet may be bonded to the peripheral surface of the main body 52.

Figure 9:
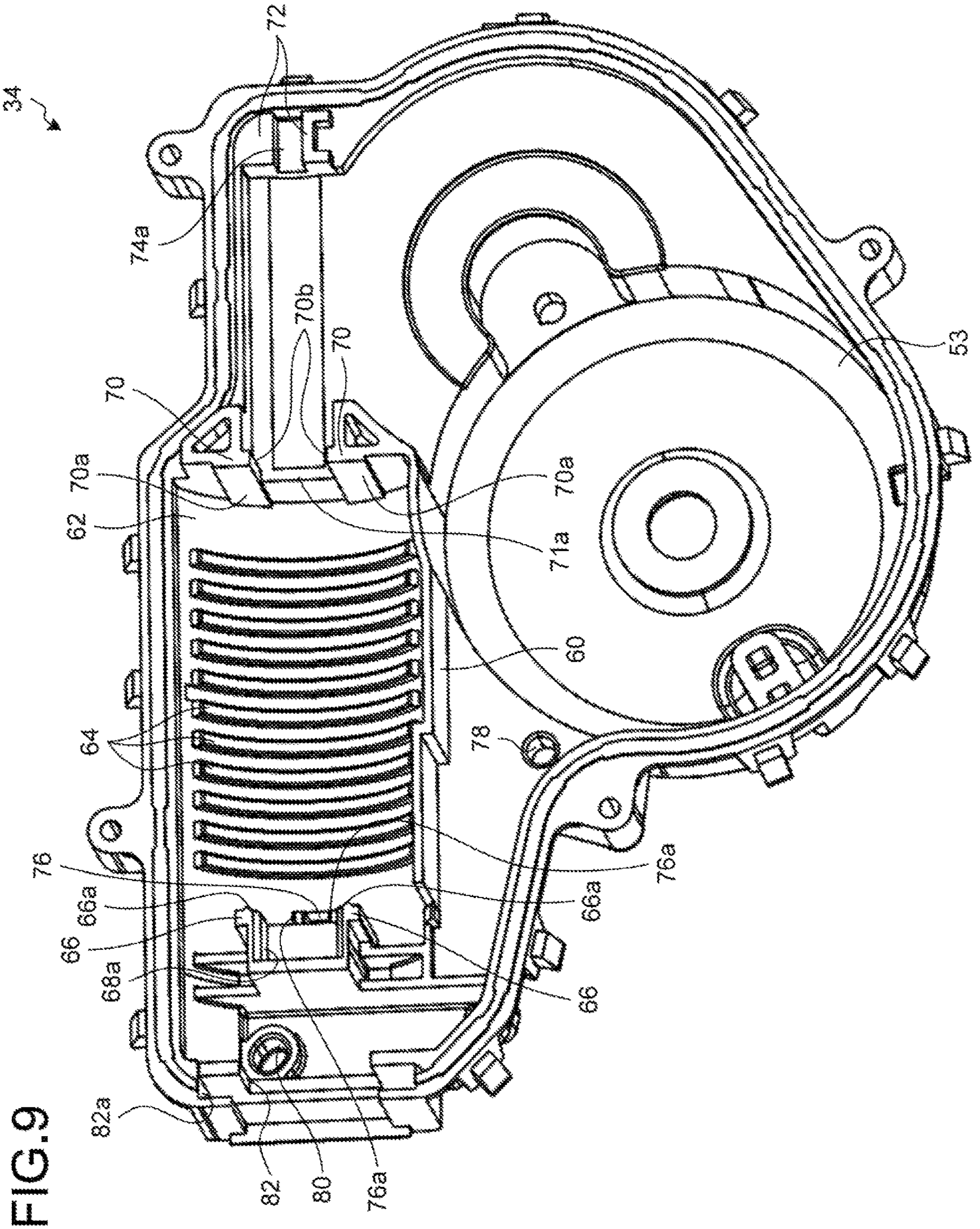
FIG. 9 is a perspective view of a case.
Figure 10:
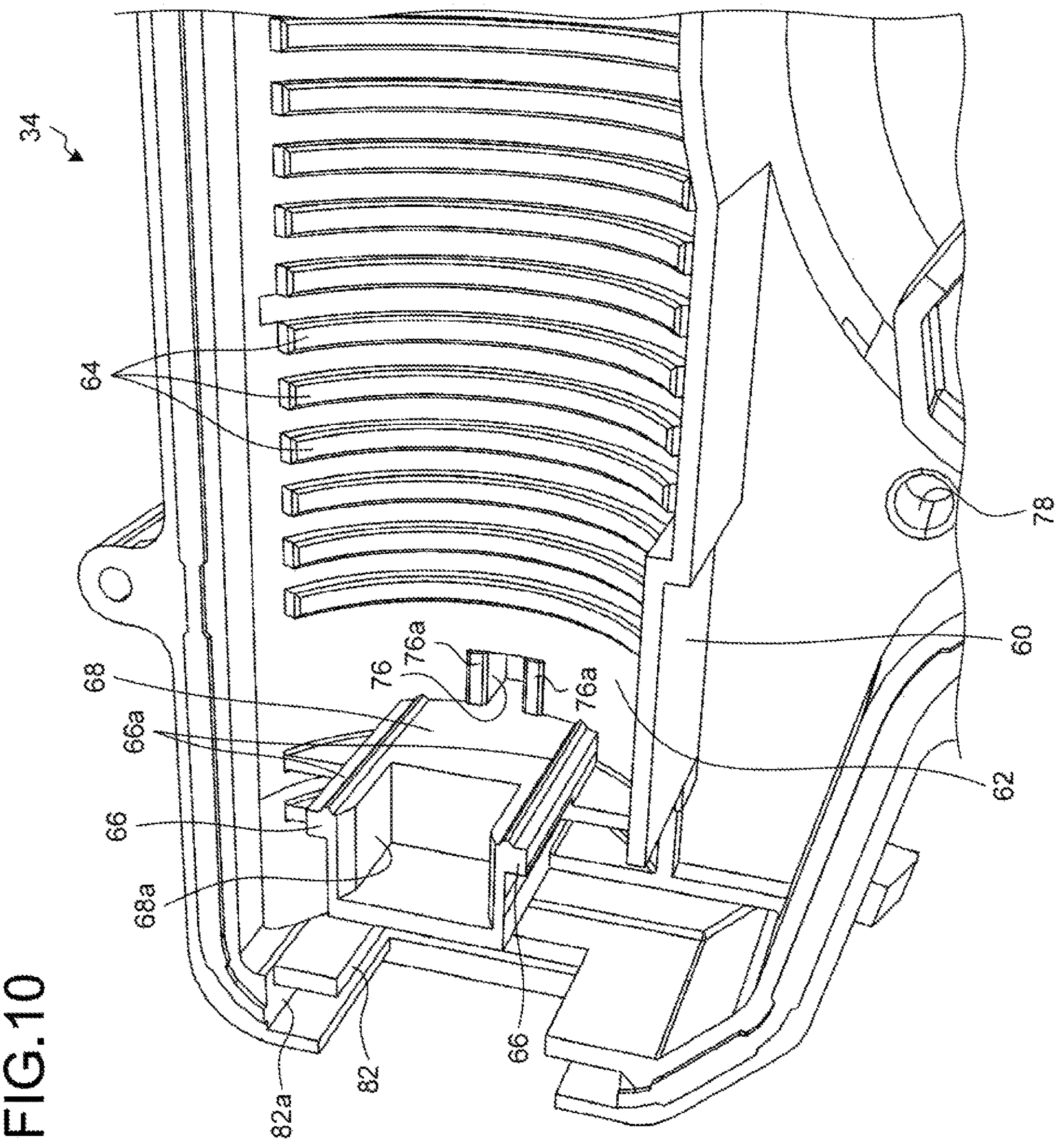
FIG. 10 is a partially enlarged perspective view of the case.

FIG. 9 is a perspective view of the case 34. FIG. 10 is a partially enlarged perspective view of the case 34.

As illustrated in FIG. 7, FIG. 9, and FIG. 10, a main body storage chamber 62 is formed on a part of the case 34 by a portion recessed in a cylindrical surface shape and a wall 60. The main body 52 of the motor 38 is stored in the main body storage chamber 62. The main body storage chamber 62 includes a plurality of arc-shaped projections 64 that extend in the circumferential direction and that come into contact with the side surface of the main body 52 of the motor 38. The arc-shaped projections 64 are arranged in the axial direction with respect to the motor 38. In this example, there are eleven arc-shaped projections 64.

The main body storage chamber 62 and the arc-shaped projections 64 are also provided on the cover 36 (see FIG. 6). The main body storage chambers 62 of the case 34 and the cover 36 are combined to store the whole main body 52. The arc-shaped projections 64 of the case 34 and the cover 36 come into contact with a wide range of the peripheral surface of the main body 52, and prevent the main body 52 from moving in the circumferential direction or vibrating. Moreover, the arc-shaped projections 64 improve the rigidity of the case 34 and the cover 36, and prevent vibration and resonance caused by the motor 38 or another external force. Although not illustrated, if a rubber sheet is bonded to the peripheral surface of the main body 52, the arc-shaped projections 64 can support the main body 52 elastically and reasonably firmly via the rubber sheet. A pair of first support pieces (base end support parts) 66 are formed on the case 34. Each of the first support pieces 66 is a part of a block 68 that stands upright from the bottom of the main body storage chamber 62. A concave part 68*a* is formed on the block 68. The first support pieces 66 protrude toward the opening side (near side of the paper surface in FIG. 9 and FIG. 10) of the main body storage chamber 62 with the concave part 68*a* interposed therebetween. A projection 66*a* protruding slightly toward the tip end side with respect to the rooter 38 is provided on the first support piece 66. The projection 66*a* has a triangular cross section, and extends along the extending direction of the first support piece 66. The projections 66*a* support the plane part 52*a* on the base end side of the motor 38, by coming in contact with the plane part 52*a* at symmetrical positions on both sides with the rotating shaft 54 interposed therebetween. The plane part 52*a* is formed in an elliptical shape, and each projection 66*a* comes into contact with the plane part 52*a* along the longitudinal direction. The projection 66*a* prevents the main body 52 from moving toward the base end side or vibrating. Moreover, the projection 66*a* is formed in a triangular shape, and the top part comes into contact with the plane part 52*a*. Thus, the projection 66*a* has a small contact area, can be slightly elastically compressed, and is suitable for supporting the main body 52. Furthermore, because the projection 66*a* extends in the mounting direction of the motor 38 with respect to the case 34, the motor 38 can be inserted smoothly.

A pair of second support pieces (tip end support parts) 70 are formed on the case 34. The second support pieces 70 are provided on the tip end side of the main body storage chamber 62. The second support pieces 70 have base end surfaces 70*a* facing the base end side, and facing surfaces 70*b* facing each other.

The base end surfaces 70*a* support the motor 38 by coming into contact with the tip end surface of the motor 38, at symmetrical positions on both sides of the motor 38 with the rotating shaft 54 interposed therebetween. The base end surfaces 70*a* prevent the main body 52 from moving toward the tip end side, or vibrating. Moreover, as described above, because the base end side of the main body 52 is supported by the projection 66*a*, both sides of the main body 52 in the axial direction are supported. Consequently, the main body 52 is stabilized in the axial direction.

The facing surfaces 70*b* support both sides of the cylindrical part 52*c* of the motor 38. A pair of the facing surfaces 70*b* support three sides of the cylindrical part 52*c* with a bottom part 71*a* interposed therebetween. The pair of facing surfaces 70*b* and the bottom part 71*a* may be formed in an arc-shaped concaved part along the peripheral surface of the cylindrical part 52*c*. The facing surfaces 70*b* and the bottom part 71*a* are lightly in contact with the cylindrical part 52*c* or a minute gap is provided therebetween. A support projection 71*b* (see FIG. 11) is formed on the cover 36 at a location facing the bottom part 71*a*. The support projection 71*b* supports both sides of the cylindrical part 52*c* with the bottom part 71*a*.

The support projection 71*b* is formed in a plate shape elongated in a direction perpendicular to the shaft of the rotating shaft 54. The cross section of the tip end of the support projection 71*b* is formed in a triangular shape. The support projection 71*b* has a small contact area with respect to the cylindrical part 52*c*, can be slightly elastically compressed, and is suitable for supporting the cylindrical part 52*c*. In this manner, the four sides of the cylindrical part 52*c* are supported by the facing surfaces 70*b*, the bottom part 71*a*, and the support projection 71*b*, and the tip end part of the main body 52 is stabilized.

A pair of third support pieces 72 are integrally molded on the case 34. The pair of third support pieces 72 support the three sides of the tip end part of the rotating shaft 54 with a bottom part 74*a* interposed therebetween. The pair of third support pieces 72 and the bottom part 74*a* may also be formed in an arc-shaped concave part along the peripheral surface of the rotating shaft 54. The third support pieces 72 and the bottom part 74*a* are lightly in contact with the rotating shaft 54 or a minute gap is provided therebetween. A support surface 74*b* (see FIG. 11) is formed on the cover 36 at a location facing the bottom part 74*a*. The support surface 74*b* supports both sides of the tip end of the rotating shaft 54 with the bottom part 74*a*. In this manner, the four sides of the tip end of the rotating shaft 54 are supported by the third support pieces 72, the bottom part 74*a*, and the support surface 74*b*. Thus, the rotating shaft 54 can be stably rotated.

A rectangular-shaped attachment hole 76 is formed on the base end side end part of the main body storage chamber 62 in the case 34, adjacent to the block 68. A small projection 76*a* is provided on both sides of the attachment hole 76. An attachment hole 78 and an attachment hole 80 are also provided on the bottom surface of the case 34. The attachment hole 78 is formed in the vicinity of the wall 60. The attachment hole 80 is formed on the base end side than the main body storage chamber 62. The attachment hole 80 is a long hole slightly elongated in a direction facing the attachment hole 78. The attachment holes 76, 78, and 80 are holes used for attaching the terminal holding member 40. The attachment holes 76, 78, and 80 may be bottomed holes or through holes. A coupler notch 82 from which the coupler 102, which will be described below, protrudes to the outside is formed on the case 34.

Figure 11:
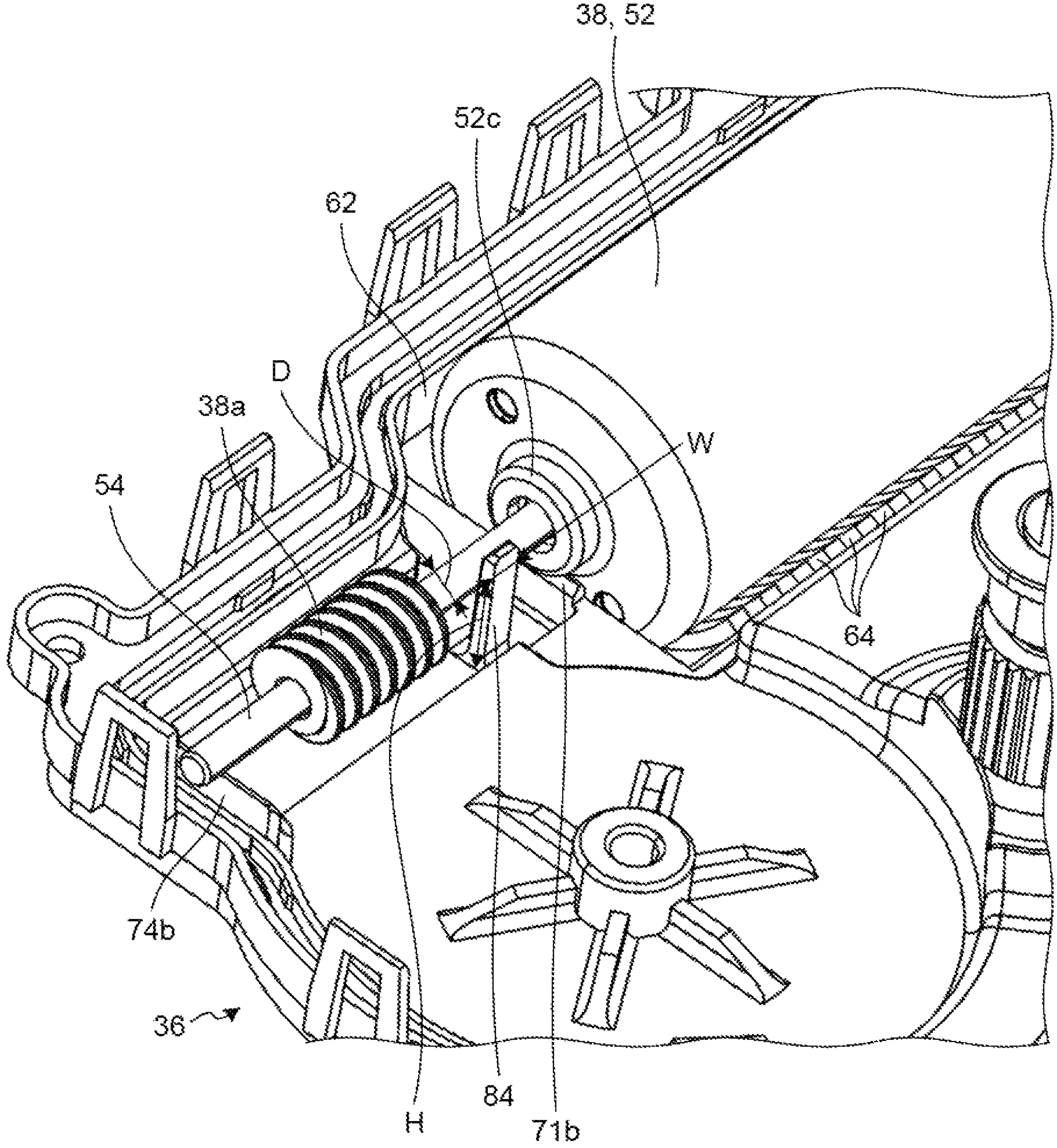
FIG. 11 is a partially enlarged perspective view of the cover and the motor.

FIG. 11 is a partially enlarged perspective view of the cover 36 and the motor 38. The cover 36 includes a shaft abutment projection 84. The shaft abutment projection 84 stands upright from the bottom surface of the cover 36. The shaft abutment projection 84 is made of a resin material integrally molded with the cover 36, and hardly increases the cost. The shaft abutment projection 84 is a small resin piece, and even if the shaft abutment projection 84 is separately formed from the cover 36, compared to a bearing and the like, the cost is sufficiently low. As described above, because the cover 36 is softer than the case 34, the shaft abutment projection 84 has sufficient elasticity.

The shaft abutment projection 84 comes into contact with the rotating shaft 54 between the main body 52 and the third support pieces 72 at the tip end. More specifically, the shaft abutment projection 84 comes into contact with the rotating shaft 54 from the side between the main body 52 and the worm gear 38*a*. Such a shaft abutment projection 84 can stabilize the rotation of the rotating shaft 54. In particular, the shaft abutment projection 84 can prevent looseness in the radial direction, and reduce vibration and noise.

The shaft abutment projection 84 is formed in a slightly long shape, has bending elasticity in a direction of coining into contact with the rotating shaft, and is elastically deformable. The shaft abutment projection 84 also elastically comes into contact with the rotating shaft 54, and suppresses the vibration of the rotating shaft 54. To enable the shaft abutment projection 84 to generate a suitable elasticity with respect to the rotating shaft 54, the height H from the bottom surface of the cover 36 to the abutment part with respect to the rotating shaft 54 may be two times or more of the diameter D of the rotating shaft 54, or preferably about three times of the diameter D. To enable the shaft abutment projection 84 to come into contact with the rotating shaft 54 in a stable manner, the width W may set substantially equal to the diameter D. More specifically, the width W may be about 0.5 times to 1.5 times with respect to the diameter D. As described above, for example, the cover 36 is made of POM, and has excellent elasticity and abrasion resistance. Thus, the cover 36 can press the rotating shaft 54 with suitable elasticity and has high durability.

The shaft abutment projection 84 supports the rotating shaft 54 from the lower side in the vertical direction (vertical direction in a vehicle attachment state) (see FIG. 6). The shaft abutment projection 84 acts so as to support the gravity of the rotating shaft 54 and the main body 52, and improves the vibration suppression effect. The shaft abutment projection 84 can suitably suppress vibration and noise, as long as the shaft abutment projection 84 comes into contact with at least one side of the rotating shaft 54.

Returning to FIG. 3, the output lever 18 is separated from the support member 27 when viewed from the rear (approaching/separating direction of the striker S). Moreover, the support member 27 and the meshing part 12 surround the output lever 18 when viewed from the rear. That is, the output lever 18 is arranged inside a region 85 surrounded by the support member 27 and the meshing part 12. When viewed from the rear, the support member 27 extends along the circular projection part 53.

In the door opening and closing device 10 configured in this manner, when viewed from the rear, the output lever 18 is separated from the support member 27. Thus, the output lever 18 can be protruded toward the rear without interfering the support member 27, and the flexibility of arranging the output lever 18 and the support member 27 in the front and rear direction is improved. Thus, when viewed from the above (in other words, a direction perpendicular to the approaching/separating direction of the striker S) (see FIG. 4), it is possible to sufficiently reduce the gap between the output lever 18 and the support member 27, or overlap parts of the output lever 18 and the support member 27. As a result, the size of the door opening and closing device 10 can be suppressed in the front and rear direction, and further downsizing is possible.

Moreover, the latch lever 24 and the open lever 26 of the meshing part 12 are driven via the output lever 18. Thus, for example, compared to when the latch lever 24 and the open lever 26 are driven directly by the output gear 46, there is flexibility in layout, and the motor 38 can be arranged at the lower part. As a result, the size of the door opening and closing device 10 can be suppressed in the up and down direction, and further downsizing is possible. Furthermore, the output lever 18 is protruded toward the rear without interfering the support member 27. Thus, the distance between the latch lever 24 and the open lever 26 is reduced, and the loss of transmission power is reduced. As a result, the output of the motor 38 can be reduced, and further downsizing is possible.

The door opening and closing device 10 is fixed to the back door by the attachment pieces 33 on the slightly lower side. During the door closing operation and during the acceleration and deceleration of a vehicle, the inertial force in the front and rear direction is applied to the actuator unit 14 on the upper side. However, because the actuator unit 14 is fixed to the second bracket 16 by the screw B2, the oscillation is prevented. Because the actuator unit 14 is fixed to the second bracket 16 with the two screws B2 suitably separated in the right and left direction, the stability is high.

When viewed from the rear, the support member 27 and the meshing part 12 surround the output lever 18, are well balanced, and have high strength.

When viewed from the rear, the support member 27 extends in an arc shape along the circular projection part 53, and the second bracket 16 of the support member 27 is fastened to the actuator unit 14. Thus, the layout properties of the meshing part 12 and the actuator unit 14 is further improved. Moreover, a fastening part (fastened by the screw B2) of the meshing part 12 and the actuator unit 14 can be arranged above the meshing part 12 to some degree within a limited space. As a result, further downsizing and increase in strength are possible.

Because the circular projection part 53 is arranged inside the region 85 (see FIG. 3), the layout flexibility of the support member 27 and the circular projection part 53 is high. Thus, it is possible to sufficiently reduce the gap between the circular projection part 53 and the support member 27, or overlap parts of the circular projection part 53 and the support member 27. As a result, it is possible to suppress the size of the door opening and closing device 10 in the front and rear direction.

The meshing part 12 and the actuator unit 14 connected via the support member 27 can be disassembled. As a result, the meshing part 12 and the actuator unit 14 are suitable for manufacturing, assembling, and maintenance.

The deceleration mechanism 51 that decelerates the rotation of the motor 38 and that transmits the decelerated rotation to the output lever 18 is provided on the actuator unit 14 instead of the meshing part 12, and is covered by the housing with the motor 38. As a result, the deceleration mechanism 51 is protected from dust and the like.

The first brackets 22 and the second bracket 16 are connected by the joint screw B1 and can be disassembled. As a result, the first brackets 22 and the second bracket 16 are suitable for manufacturing, assembling, and maintenance. The first brackets 22 and the second bracket 16 may be integrally formed. The support member 27 formed by the first brackets 22 and the second bracket 16 may be integrally formed with the body 20 or the attachment piece 33.

The support member 27 is fastened to the door of a vehicle together with the meshing part 12 by the attachment piece 33. As a result, the support member 27 is stabilized.

In the door opening and closing device 10, the case 34 and the cover 36 of the actuator unit 14 are made of a resin material. As a result, the weight can be reduced. On the other hand, the support member 27 made of a metal material is used for connecting the actuator unit 14 and the meshing part 12, and the support member 27 is connected to the case 34 to ensure a predetermined strength.

Figure 12:
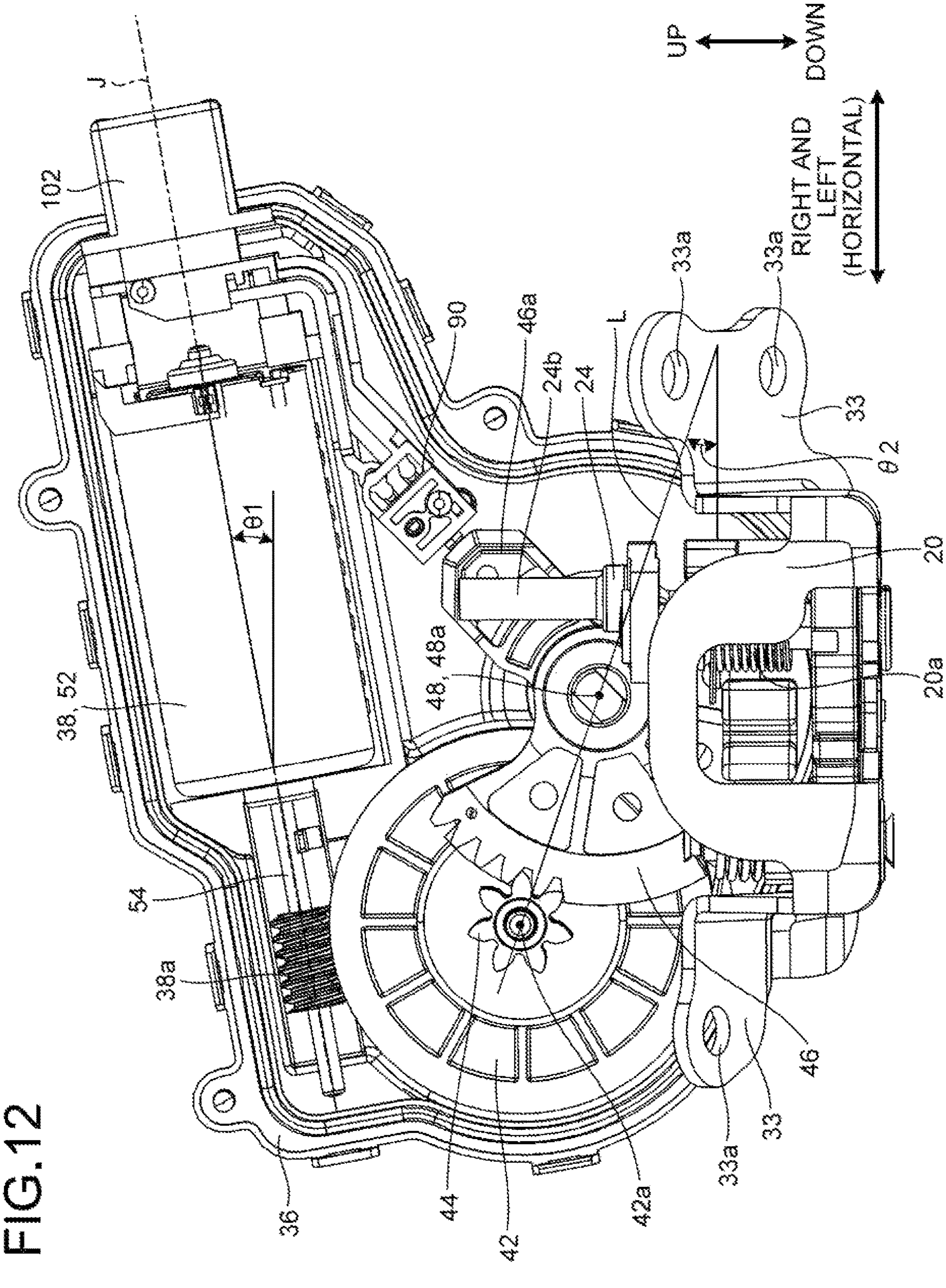
FIG. 12 is a rear view of the actuator unit in a state in which the case is removed.

FIG. 12 is a rear view of the actuator unit 14 in a state in which the case 34 is removed. A shaft J of the motor 38 is inclined at an angle θ1 with respect to the horizon so that the main body 52 at the right side in FIG. 12 is slightly above the rotating shaft 54 at the left side. The angle θ1 is small, and for example, about 10 degrees. Because the shaft J is inclined, the grease applied on the worm gear 38*a* is prevented from flowing toward the main body 52. Because the angle θ1 is small, the main body 52 does not excessively protrude upward.

A straight line L that joins a shaft center 42*a* of the worm wheel 42 and a shaft center 48*a* of the output shaft 48 is inclined at an angle θ2 with respect to the horizon so that the shaft center 48*a* at the right side in FIG. 12 is slightly below the shaft center 42*a* at the left side. The angle θ2 is equal to or less than 45 degrees, and for example, about 20 degrees. Because the straight line L is inclined, the output efficiency is increased. Because the angle θ2 is equal to or less than 45 degrees, the height difference between the worm wheel 42 and the output gear 46 will not be excessive, and the size in the up and down direction can be suppressed. Because the straight line L and the shaft J are inclined opposite to each other, an appropriate space for arranging the projection 46*a* and the switch 90 is formed between the main body 52 and the shaft center 48*a*. As a result, the space efficiency is improved.

Figure 13:
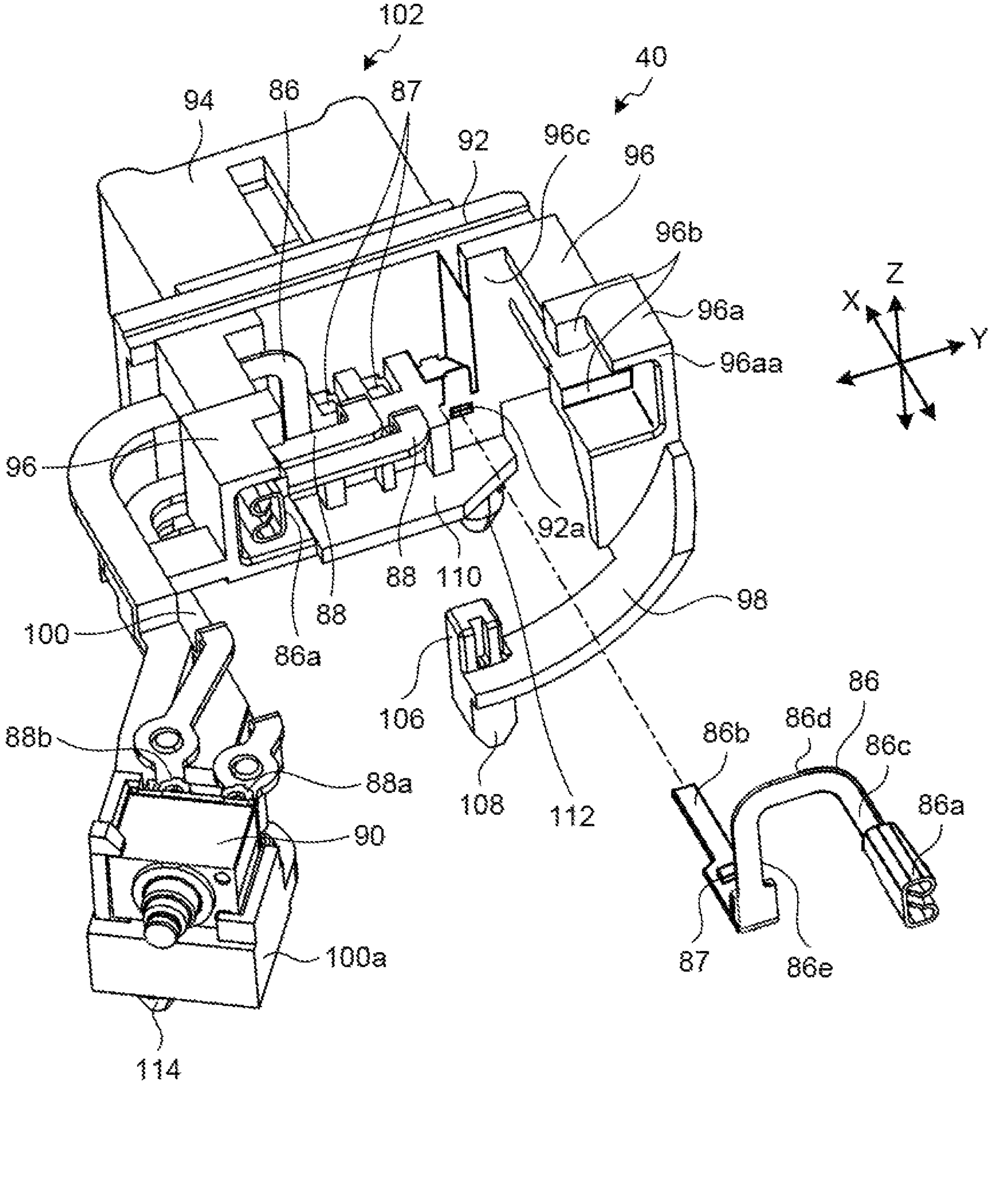
FIG. 13 is a partially exploded perspective view of a terminal holding member.

FIG. 13 is a partially exploded perspective view of the terminal holding member 40. In FIG. 13, the extending direction of a coupler housing 94 is the X direction, the direction perpendicular to the X direction is the Y direction, and the direction perpendicular to the X direction and the Y direction is the Z direction. The X direction matches the axial direction of the motor 38 (see FIG. 4).

The terminal holding member 40 holds two power source terminals 86 and 86, two switch terminals 88 and 88, and the switch 90. In FIG. 13, one of the power source terminals 86 is separated from the terminal holding member 40. Each of the power source terminals 86 and the switch terminals 88 is made of a metal plate. Each power source terminal 86 is connected to the motor 38. Each switch terminal 88 is connected to the switch 90. The switch 90 detects the position of the projection 46*a* (see FIG. 7) of the output gear 46.

The two power source terminals 86 have symmetrical structures. A power supply end 86*a* is formed on one of the ends of the power source terminal 86, and a coupler pin 86*b* is formed on the other end. The power supply end 86*a* and the coupler pin 86*b* extend in the X direction.

The power supply end 86*a* is a portion fit and connected to the power input end 56 of the motor 38 in the X direction, and supplies power to the motor 38. The power supply end 86*a* and the power input end 56 may only be fit in the X direction, and the power supply end 86*a* may be formed in a convex shape and the power input end 56 may be formed in a concave shape. The power supply end 86*a* is formed by rounding a metal plate so that the power input end 56 can be inserted therein. The power supply end 86*a* is slightly swollen in the Z direction.

An X member 86*c* extends from the power supply end 86*a* in the X direction. An end part of the X member 86*c* is coupled to a Y member 86*d* that bends and extends in the Y direction. The other end of the Y member 86*d* is coupled to a Z member 86*e* extending in the Z direction. The Y member 86*d* and the Z member 86*e* form the same surface. The other end of the Z member 86*e* is bent and coupled to the coupler pin 86*b*. A barb 87 is formed on the coupler pin 86*b*.

A switch end 88*a* is formed on one of the ends of the switch terminal 88, and a coupler pin 88*b* is formed on the other end. The switch end 88*a* is connected to the switch 90. The switch end 88*a* and the coupler pin 88*b* are coupled via a plurality of bending parts. A barb 87 is formed on the coupler pin 88*b*.

The terminal holding member 40 includes a base plate 92, the coupler housing 94, two motor connection parts 96, an arc-shaped arm (peripheral surface support part) 98, and an extension part 100. The coupler housing 94 protrudes from the base plate 92 toward one side in the X direction. The two motor connection parts 96 protrude from both ends of the base plate 92 toward the other side in the X direction. The arc-shaped arm 98 extends from one tip end surface 96*aa* of the motor connection part 96. The extension part 100 extends from the other tip end of the motor connection part 96 to the location of the switch 90. The terminal holding member 40 is made of a resin material, and a switch holding part 100*a* for holding the switch 90 is provided on the tip end of the extension part 100.

The two motor connection parts 96 have symmetrical structures. A box 96*a* that surrounds the power supply end 86*a* is provided on the tip end of the motor connection part 96. A pair of upper and lower support surfaces 96*b* that come into contact with a portion of the power supply end 86*a* swollen in the Z direction is formed in the box 96*a*. A support surface 96*c* that cones into contact with the Y member 86*d* and the Z member 86*e* is formed on a portion where the motor connection part 96 is integrally formed with the base plate 92. The power source terminal 86 is fixed, when the coupler pin 86*b* is inserted into a pin hole 92*a* of the base plate 92 in the X direction, and when the barb 87 is engaged with a predetermined engagement part. Similarly, the switch terminal 88 is also fixed, when the coupler pin 88*b* is inserted into the pin hole 92*a* in the X direction.

In the terminal holding member 40, there is no particular obstacle on the insertion side of the power source terminals 86 and the switch terminals 88 on the base plate 92, and the terminals 86 and 88 can be easily inserted. More specifically, as will be described below, the arc-shaped arm 98 extends about 90 degrees along the peripheral surface of the main body 52, from one of the pair of motor connection parts 96 (right side in FIG. 15), and does not extend to the other motor connection part 96 (left side in FIG. 15). Thus, it is possible to easily mount the other motor connection part 96 and the switch terminal 88 arranged along the extension part 100 on the terminal holding member 40. The base plate 92 is fixed by being fit into a concave part 82*a* (see FIG. 10) provided on the coupler notch 82 (see FIG. 10).

Figure 14:
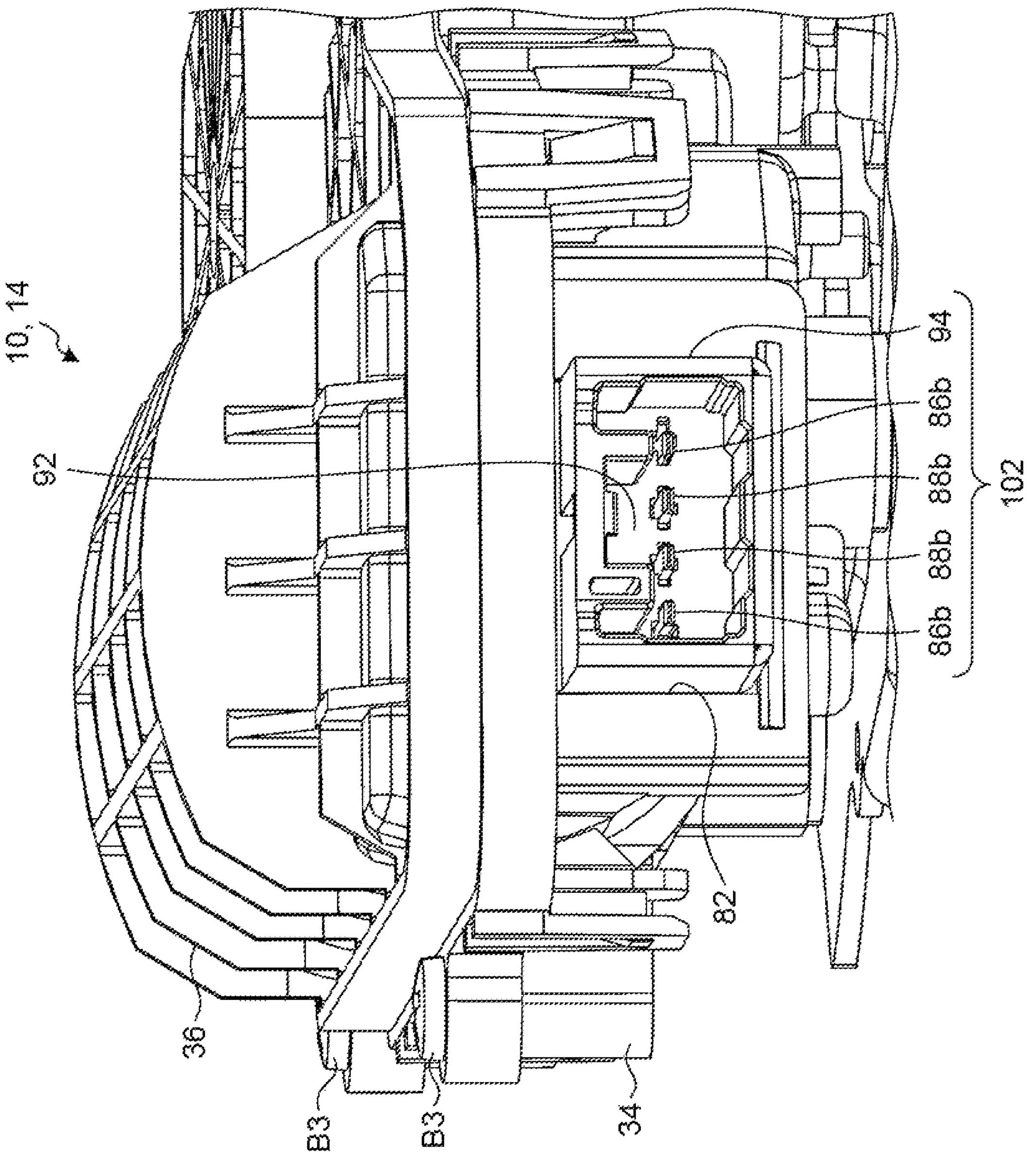
FIG. 14 is an enlarged view of a coupler and the surroundings thereof in the door opening and closing device.

FIG. 14 is an enlarged view of the coupler 102 and the surroundings thereof in the door opening and closing device 10. As illustrated in FIG. 14, the coupler housing 94 protrudes from the coupler notch 82 on the case 34. The coupler pins 86*b* and 88*b* protrude from the base plate 92, and are arranged in the coupler housing 94. The coupler housing 94 and the coupler pins 86*b* and 88*b* form the coupler 102. The coupler 102 is connected to the BCM via a harness, which is not illustrated.

Returning to FIG. 13, a part of the power supply end 86*a* is supported by the support surface 96*b*, and the Y member 86*d* and the Z member 86*e* are supported by the support surface 96*c*. As a result, the power source terminal 86 is stabilized. Moreover, the power source terminal 86 is supported by the support surfaces 96*b* and 96*c*, when the power input end 56 (see FIG. 6) of the motor 38 is inserted into the power supply end 86*a* along the X direction. As a result, the power input end 56 can be stably inserted. The switch terminal 88 is provided along the extension part 100.

The arc-shaped arm 98 supports the motor 38 by coming into contact with the peripheral surface of the main body 52 along the circumferential direction. The arc-shaped arm 98 is an arc-shaped plate that comes into contact with the peripheral surface of the main body 52 over about 90 degrees. The thickness of the arc-shaped arm 98 is about the same as that of the arc-shaped projections 64 (see FIG. 10). A motor engagement projection 106 and an attachment projection 108 are provided on the tip end of the arc-shaped arm 98.

The motor engagement projection 106 protrudes upward in FIG. 13 (one direction in the Z direction) from the tip end of the arc-shaped arm 98. The motor engagement projection 106 is a portion that fits into the positioning engagement concave part 58 (see FIG. 6) of the motor 38, and has a substantially rectangular cross section so as to fit into the positioning engagement concave part 58. The attachment projection 108 protrudes downward in FIG. 13 (the other direction in the Z direction) from the tip end of the arc-shaped arm 98. In brief, the motor engagement projection 106 and the attachment projection 108 are arranged on a straight line along the Z direction. A gap between the motor engagement projection 106 and the positioning engagement concave part 58 in the circumferential direction of the motor 38 is set to zero or substantially zero.

In the terminal holding member 40, a small plate 110 (see also FIG. 15 and FIG. 6) protrudes from the lower end of the base plate 92 in FIG. 13 in the X direction. An attachment projection 112 protrudes from the lower surface of the small plate 110. An attachment projection 114 (see also FIG. 15 and FIG. 6) protrudes from the lower surface of the switch holding part 100*a* in FIG. 13.

The attachment projections 108, 112, and 114 are members used for attaching the terminal holding member 40 to the case 34. The attachment projection 108 is fit into the attachment hole 76 (see FIG. 9) of the case 34. The cross section of the attachment projection 108 is formed in a substantially rectangular shape so as to fit into the attachment hole 76. The attachment projection 112 fits into the attachment hole 80 (see FIG. 9) of the case 34. The attachment projection 114 fits into the attachment hole 78 (see FIG. 9) of the case 34. On the side surfaces of the attachment projections 112 and 114, strips 112*a* and 114*a* (see FIG. 15) for improving the fitting of the attachment projections 112 and 114 to the attachment holes 78 and 80 are provided. The attachment projections 108, 112, and 114 are formed in a tapered shape so as to be easily inserted into the attachment holes 76, 78, and 80. To fix the terminal holding member 40 and the case 34, it is also possible to provide projections corresponding to the attachment projections 108, 112, and 114 on the case 34, and provide holes corresponding to the attachment holes 76, 78, and 80 on the terminal holding member 40.

To the terminal holding member 40 configured in this manner, during the assembly of the door opening and closing device 10, the motor 38 is fixed first. That is, as illustrated in FIG. 6, the motor 38 and the terminal holding member 40 are brought relatively close to each other in the axial direction with respect to the motor 38 (in brief, the extending direction of the rotating shaft 54, or the X direction), and the pair of power input ends 56 are fit to the pair of power supply ends 86*a*. In this process, because the positioning engagement concave part 58 is opened in the axial direction with respect to the motor 38, the motor engagement projection 106 is inserted into and fit to the positioning engagement concave part 58. In this manner, the motor 38 and the terminal holding member 40 are temporarily fixed and assembled as in FIG. 15.

Figure 15:
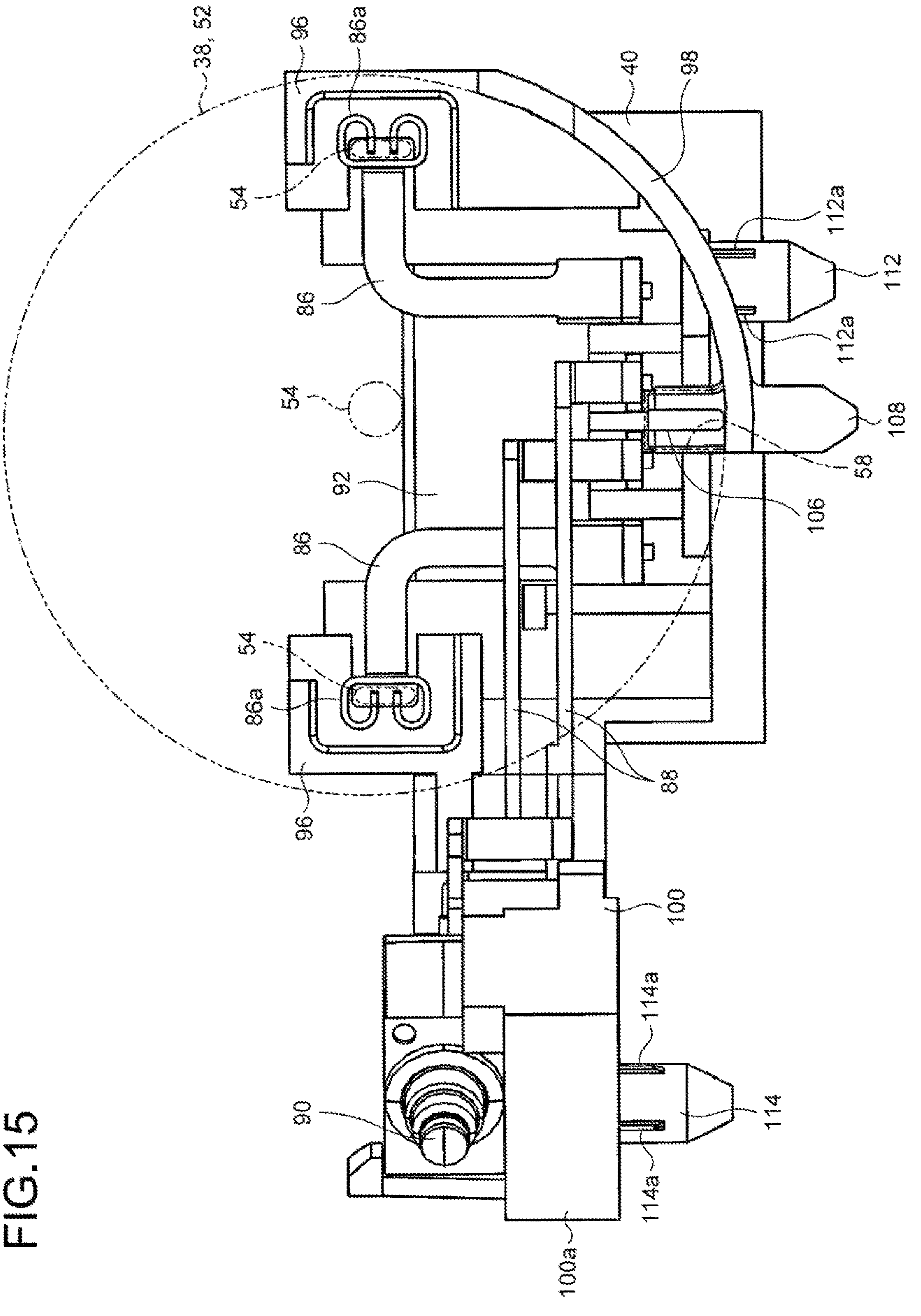
FIG. 15 is a diagram of the terminal holding member viewed from the axial direction with respect to the motor.

FIG. 15 is a diagram of the terminal holding member 40 viewed from the axial direction with respect to the motor 38. In FIG. 15, the motor 38 and some of the components are illustrated in virtual lines. The temporarily fixed motor 38 and terminal holding member 40 are fixed at three locations. That is, at fixing parts formed when the pair of power input ends 56 are fit to the pair of power supply ends 86*a*, and a fixing part formed when the motor engagement projection 106 is fit into the positioning engagement concave part 58. By the fixing parts at the three locations, the motor 38 is stably held with respect to the terminal holding member 40 without displacement such as rotation and twist. Moreover, because a part of the peripheral surface of the main body 52 is supported by the arc-shaped arm 58, the motor 38 is further stabilized.

What is called a D-cut surface to prevent rotation is not formed on the peripheral surface of the main body 52 of the motor 38, but the main body 52 is downsized accordingly. Although the D-cut surface is not formed on the main body 52, because the motor engagement projection 106 and the positioning engagement concave part 58 are fit to each other, actions of positioning and prevention of rotation are obtained.

Moreover, when viewed in the axial direction, the positioning engagement concave part 58 is arranged on the straight line that is perpendicular to the straight line that joins the pair of power input ends 56, and that passes through the center point (in brief, the position of the rotating shaft 54). Furthermore, in other words, when viewed in the axial direction, the motor engagement projection 106 is arranged on the straight line that is perpendicular to the straight line that joins the pair of power supply ends 86*a*, and that passes through the center point. With such an arrangement, the motor 38 is fixed to the terminal holding member 40 in a good balance.

The power input ends 56 and the power supply ends 86*a* are power energization means and are not necessarily strong mechanically. However, in the temporarily assembled state until the terminal holding member 40 and the motor 38 are mounted on the case 34, a large external force will not be applied except the own weight of the motor 38. The terminal holding member 40 and the motor 38 are also assembled to the case 34 at a relatively early stage. Thus, there is no problem in strength. Moreover, because the main body 52 is supported by the arc-shaped arm 93, a large force will not be applied to the power input ends 56 and the power supply ends 86*a*.

Figure 16:
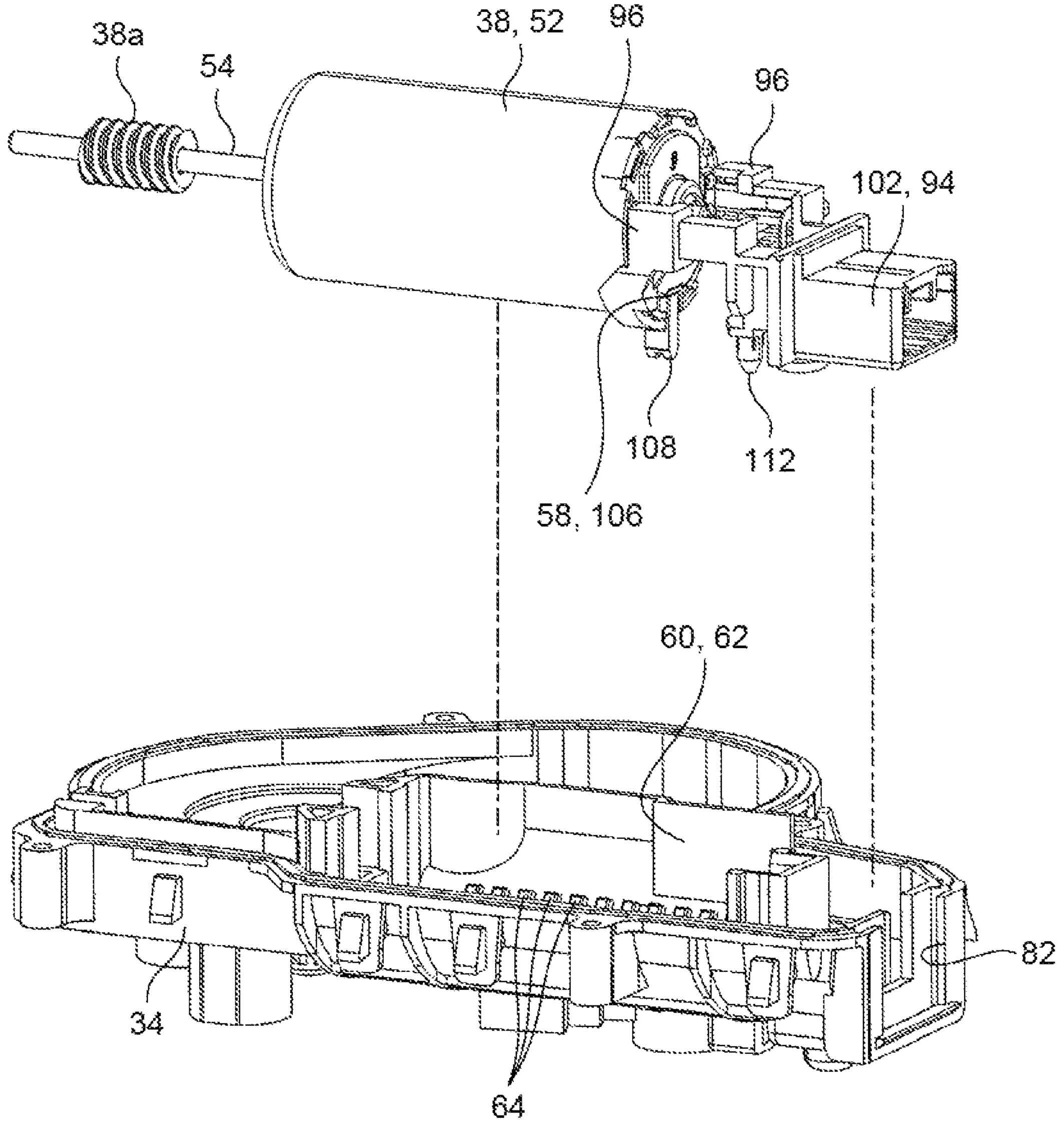
FIG. 16 is a diagram illustrating a state of mounting the temporarily assembled motor and terminal holding member on the case.

FIG. 16 is a diagram illustrating a state of mounting the temporarily assembled motor 38 and terminal holding member 40 to the case 34. As illustrated in FIG. 16, when the temporarily assembled motor 33 and terminal holding member 40 are lowered on a predetermined position on the case 34 as they are, the attachment projections 108, 112, and 114 are fit into the attachment holes 76, 78, and 80, and the terminal holding member 40 is fixed to the case.

Consequently, the coupler housing 94 is fit into the coupler notch 82. The main body 52 is stored in the main body storage chamber 62. The main body 52 is stabilized in the circumferential direction, because about a half of the peripheral surface of the main body 52 is supported by the arc-shaped projections 64 on the case 34. Moreover, because the outer peripheral surface of the arc-shaped arm 98 comes into contact with the inner peripheral surface of the main body storage chamber 62, a range of about 90 degrees of the base end side on the peripheral surface of the main body 52 is stabilized with respect to the main body storage chamber 62. The main body 52 is stabilized in the axial direction, because the plane part 52*a* (see FIG. 7), which is the base end surface of the main body 52, is supported by the projection 66*a* of the first support piece 66, and the tip end surface is supported by the base end surface 70*a* (see FIG. 7) of the second support piece 70.

In this manner, by simply lowering the temporarily assembled motor 38 and terminal holding member 40 on a predetermined position of the case 34 as they are, the portions of the motor 38 and the terminal holding member 40 are arranged at proper positions. As a result, it is possible to easily assemble the door opening and closing device 10.

The worm wheel 42, the output gear 46, and the like are mounted on the case 34 before or after the motor 38 and the terminal holding member 40 are mounted. Then, the cover 36 is mounted on the case 34. By mounting the cover 36 on the case 34, the main body 52 is stabilized in the circumferential direction, because about a half of the peripheral surface of the main body 52 is supported by the arc-shaped projections 64 on the cover 36. In brief, the main body 52 is stabilized because almost entire peripheral surface of the main body 52 is supported by the arc-shaped projections 64 on the case 34 and the cover 36.

Moreover, the cylindrical part 52*c* (see FIG. 7) of the tip end part of the main body 52 is stabilized because the four sides are supported by the facing surfaces 70*b* of the second support pieces 70, the bottom part 71*a* (see FIG. 9), and the support projection 71*b* (see FIG. 11). The tip end part of the rotating shaft 54 is stabilized because the four sides are supported by the third support pieces 72, the bottom part 74*a* (see FIG. 9), and the support surface 74*b* (see FIG. 11). The rotating shaft 54 is further stabilized by being supported by the shaft abutment projection 84 that comes into contact with the rotating shaft 54 from the side, between the main body 52 and the worm gear 38*a*. The assembly process of the door opening and closing device 10 is then finished by mounting the meshing part 12 and the like.

In such a door opening and closing device 10, the motor connection part 96 of the terminal holding member 40 holds the terminals so that the power supply end 86*a* is connected to the power input end 56 of the motor 38, and the arc-shaped arm 98 for supporting the peripheral surface of the main body 52 is provided. Thus, the motor 38 and the terminal holding member 40 can be temporarily fixed with each other in a stable manner in advance before being mounted on the case 34. Needless to say, there is no need to position the motor 38 and the terminal holding member 40 after being mounted on the case 34.

The power source terminals 86 and the switch terminals 88 are held in advance in the terminal holding member 40, and there is no need to individually connect the terminals to the motor 38 and the switch 90 in an assembly stage to the case 34. Because the two power source terminals 86 are fixed by the terminal holding member 40, polarity wiring error between the motor 38 and the coupler 102 does not occur. Because the switch terminals 88 are fixed by the terminal holding member 40, even if there are a plurality of the switches 90, wiring error does not occur.

The motor 38 is a high output type required for opening and closing the back door, and the reaction force in the circumferential direction is large. Moreover, a D-cut surface to prevent rotation is not provided on the main body 52. Thus, the main body 52 tends to shift in the circumferential direction if nothing is done. However, because the motor engagement projection 106 is engaged with the positioning engagement concave part 58, the main body 52 is positioned in the circumferential direction and is stabilized. Moreover, because the motor engagement projection 106 and the attachment projection 108 (see FIG. 15) are arranged on the straight line, the motor engagement projection 106 and the attachment projection 108 are substantially a single member, and the force in the circumferential direction applied to the main body 52 is directly supported by the case 34 via the motor engagement projection 106 and the attachment projection 103. As a result, the stability is high.

Furthermore, the main body 52 is further stabilized in the circumferential direction, because the peripheral surface and the cylindrical part 52*c* of the main body 52 are supported by parts of the case 34 and the cover 36. Still furthermore, because the main body 52 and the rotating shaft 54 are each supported at a plurality of locations, the vibration of the motor 38 is suppressed and noise is reduced.

Figure 17:
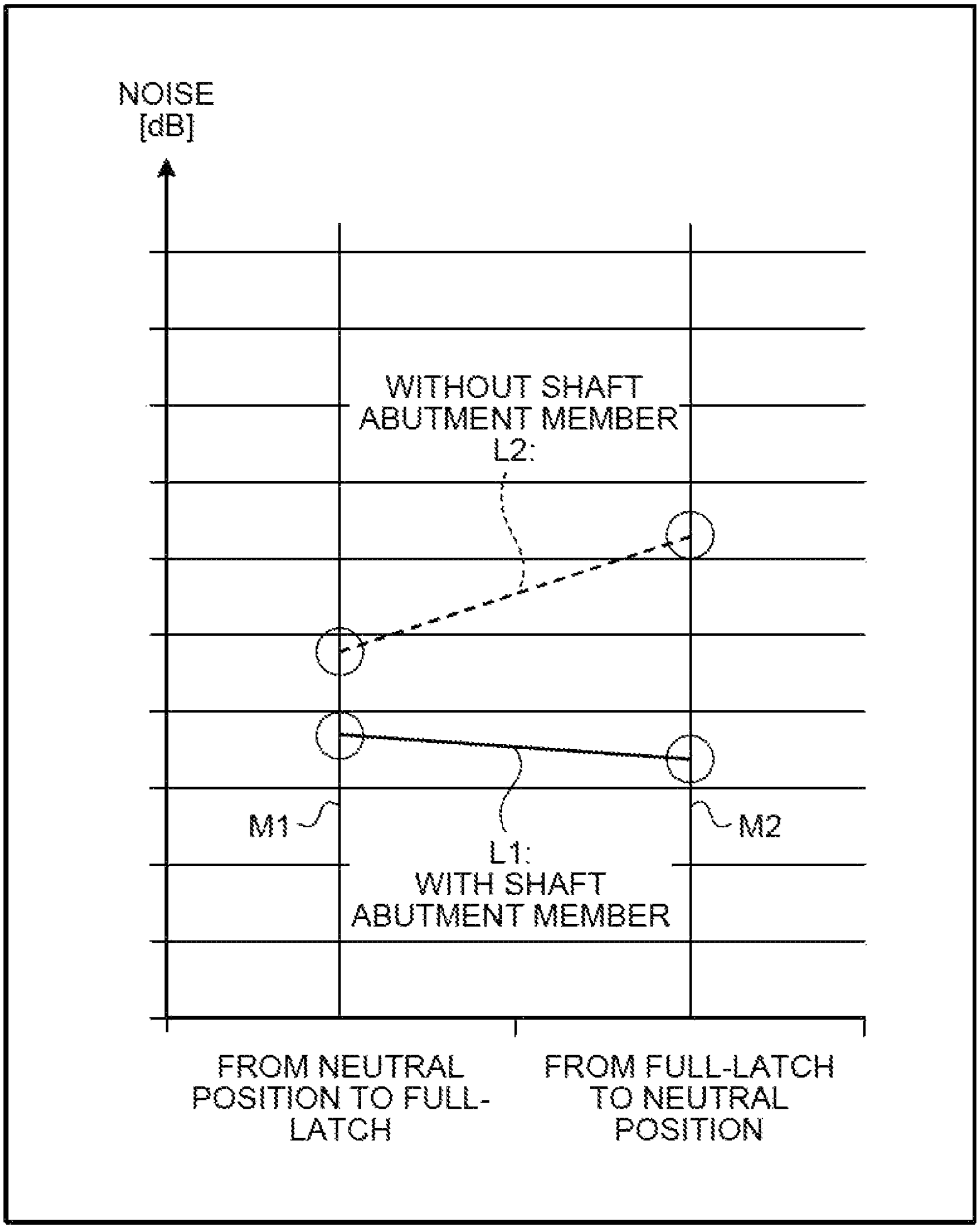
FIG. 17 is a graph illustrating the results of a comparative experiment on noise in the presence or absence of a shaft abutment projection in the door opening and closing device.

FIG. 17 is a graph illustrating the results of a comparative experiment on noise in the presence or absence of the shaft abutment projection 84 in the door opening and closing device 10. In the graph, the solid line L1 indicates the experimental result when the shaft abutment projection 84 is provided, and the broken line L2 indicates the experimental result when the shaft abutment projection 84 is not provided. In the graph, the vertical axis indicates noise (dB), and the horizontal axis indicates the type of opening and closing operation. That is, the vertical axis M1 indicates when the door opening and closing device 10 is shifted in the full-latch direction from the neutral position of the actuator unit 14 and the output lever 18, and the vertical axis M2 indicates when the actuator unit 14 and the output lever 18 are shifted to the neutral position from the full-latch state of the door opening and closing device 10. In the experiments, as a state in which the door opening and closing device 10 is attached to the vehicle, a simulated load is applied and operated, and the noise during the operation was measured. As illustrated in FIG. 11, the noise reduction effect was clearly identified in both cases when the door opening and closing device 10 was shifted from the neutral position to the full-latch state, and from the full-latch state to the neutral position. In particular, when the actuator unit 14 and the output lever 18 are shifted to the neutral position from the full-latch state of the door opening and closing device 10, the latch lever 24 is not pressed (non-load), and the vibration of the rotating shaft 54 tends to increase. Thus, the vibration suppression effect by the shaft abutment projection 84 is further increased.

Such a door opening and closing device 10 includes the shaft abutment projection 84 integrally molded with the cover 36, protruding from the bottom surface of the cover 36, and coming into contact with the rotating shaft 54 from the side. With such a shaft abutment projection 84, it is possible to suppress the vibration and noise of the rotating shaft 54. Moreover, because there is no need to provide a separate bearing or the like additionally, it is possible to easily assemble the door opening and closing device 10. Furthermore, because the number of components is not increased, it is possible to suppress the cost.

The shaft abutment projection 84 may also be formed separate from the cover 36, and attached to the cover 36. Even if the shaft abutment projection 84 is separately formed from the cover 36, the corresponding effects can be obtained as long as there is at least one shaft abutment projection 84. Thus, it is possible to suppress an increase in the number of components and an increase in cost. Moreover, because the shaft abutment projection 84 may only be provided on the rotating shaft 54 so as to have a reasonable elasticity, there is no need to accurately mount the shaft abutment projection 84. Thus, it is possible to easily assemble the door opening and closing device 10. In the door opening and closing device 10, a bearing for supporting the rotating shaft 54 may be provided according to the design conditions. When the bearing is provided, the rotation of the motor 38 is further stabilized.

There may be a plurality of the shaft abutment projections 84. The shaft abutment projections 84 may be provided separately from the cover 36 and the case 34. The shaft abutment projections B4 may be arranged along the axial direction of the rotating shaft 54. The actuator device according to the present disclosure is not limited to the door opening and closing device 10 described above, and may be applicable to other devices including an actuator such as the motor 38.

The present disclosure is not limited to the embodiment described above, and can be freely modified without departing from the spirit of the present disclosure.

In the actuator device according to the present disclosure, the output lever is separated from the support member when viewed from the approaching/separating direction of the striker with respect to the meshing part. Consequently, the output lever can be protruded in the approaching/separating direction of the striker without interfering the support member, and flexibility of arranging the output lever and the support member is improved. Thus, it is possible to sufficiently reduce the gap between the output lever and the support member on the plane, or overlap parts of the output lever and the support member. As a result, the size of the actuator device can be reduced, and further downsizing is possible.

In the actuator device according to the present disclosure, the motor connection part of the terminal holding member holds the terminals so that the power supply end is connected to the power input end of the motor. Moreover, the peripheral surface support part supporting the peripheral surface of the main body is provided. Thus, the motor and the terminal holding member can be temporarily fixed with each other in a stable manner in advance before being mounted on the case. Then, by simply lowering the temporarily assembled motor and terminal holding member on a predetermined position of the housing as they are, the portions of the motor and the terminal holding member are arranged at proper positions. As a result, it is possible to easily assemble the actuator device.

The actuator device according to the present disclosure includes the shaft abutment projection provided in the housing and that comes into contact with the rotating shaft from the side. With such a shaft abutment projection, it is possible to suppress the vibration and noise of the rotating shaft. The shaft abutment projection is inexpensive, and can reduce the cost.

Moreover, in the actuator device according to the present disclosure, the shaft abutment projection is integrally molded with the housing. With such a shaft abutment projection, it is possible to suppress the vibration and noise of the rotating shaft. Moreover, compared to the bearing, the shaft abutment projection is inexpensive, and can suppress the cost.

When the shaft abutment projection is integrally molded with the housing, it is possible to further suppress the number of components, and easily assemble the actuator device.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An actuator device, comprising:

a meshing unit configured to mesh with and release a striker, the meshing unit including a latch;

an actuator unit including a motor;

an output lever configured to rotate to transmit driving force of the motor in the actuator unit to the meshing unit to drive the meshing unit; and a support member both ends of which are coupled to the meshing unit, the support member being configured to support the actuator unit, wherein the output lever is separated from the support member when viewed from an approaching/separating direction of the striker with respect to the meshing unit, wherein the output lever includes a pin that is configured to axially protrude toward the meshing unit and in the approaching/separating direction of the striker, wherein the support member and the meshing unit surround the output lever when viewed from the approaching/separating direction of the striker with respect to the meshing unit, wherein the actuator unit includes:

an output shaft configured to rotate the output lever; and a circular projection part formed on a same axis as that of the output shaft and protruding in the approaching/separating direction of the striker, wherein the output shaft fits into a shaft hole of the output lever, wherein the output lever rotates with the output shaft, and
wherein the support member extends along the circular projection part when viewed from the approaching/separating direction of the striker.

2. The actuator device according to claim 1, wherein the meshing unit and the actuator unit are able to be disassembled, and are connected via the support member.

3. The actuator device according to claim 2, wherein the actuator unit includes a reduction gear configured to decelerate rotation of the motor and transmit the decelerated rotation to the output lever.

4. The actuator device according to claim 1, wherein
the support member includes:
a first bracket connected to the meshing unit; and
a second bracket supporting the actuator unit, and
the first bracket and the second bracket are connected by a joint screw.

5. The actuator device according to claim 1, wherein the support member is fastened to a vehicle together with the meshing unit.

6. The actuator device according to claim 1, wherein
the actuator unit is covered by a housing made of resin, and
the support member is made of metal and is connected to the housing.

7. The actuator device according to claim 1, wherein
the meshing unit includes a latch lever having an engagement pin provided on a tip end of the latch lever, and
when the output lever is rotated, the pin presses the engagement pin and rotates the latch lever.

8. The actuator device according to claim 7, wherein the latch lever rotates about a latch shaft with the latch.

* * * * *